United States Patent
Nakanishi et al.

(10) Patent No.: US 10,205,540 B2
(45) Date of Patent: Feb. 12, 2019

(54) SIGNAL DETECTION DEVICE, WIRELESS COMMUNICATION DEVICE, AND WIRELESS COMMUNICATION TERMINAL

(71) Applicant: KABUSHIKI KAISHA TOSHIBA, Minato-ku, Tokyo (JP)

(72) Inventors: Kensuke Nakanishi, Kanagawa (JP); Hiroki Mori, Kanagawa (JP); Takeshi Kumagaya, Tokyo (JP); Takahisa Kaihotsu, Tokyo (JP); Daisuke Yashima, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 15/444,774

(22) Filed: Feb. 28, 2017

(65) Prior Publication Data
US 2017/0366279 A1    Dec. 21, 2017

(30) Foreign Application Priority Data
Jun. 16, 2016    (JP) .................................. 2016-119916

(51) Int. Cl.
*H04B 17/345*    (2015.01)
*H04B 15/04*    (2006.01)
(Continued)

(52) U.S. Cl.
CPC .............. *H04B 15/04* (2013.01); *H04B 1/04* (2013.01); *H04B 1/16* (2013.01); *H04B 17/345* (2015.01); *H04W 16/14* (2013.01)

(58) Field of Classification Search
CPC ... H04B 1/04; H04B 1/06; H04B 1/10; H04B 1/12; H04B 1/16; H04B 15/04;
(Continued)

(56) References Cited

U.S. PATENT DOCUMENTS 6,850,735 B2    2/2005   Sugar et al.
2002/0039888 A1  4/2002   Hama
2017/0264380 A1*  9/2017  Cohen .................... H04B 17/26

FOREIGN PATENT DOCUMENTS

EP    1 253 753 A2    10/2002
JP    H09-064827 A     3/1997
(Continued)

OTHER PUBLICATIONS

Stacey, Robert: "Specification Framework for TGax", IEEE 11-15-0132-17-00ax-spec-framework, Intel, May 2016, pp. 1-61.
(Continued)

*Primary Examiner* — Shawkat M Ali
(74) *Attorney, Agent, or Firm* — Foley & Lardner LLP

(57) ABSTRACT

A signal detection device according to the embodiment of the present invention includes a memory and processing circuitry. The memory is configured to store a program. The processing circuitry is for executing the program and is configured to calculate a first signal level indicative of a signal level of a digital complex signal; calculate a first variation indicative of a temporal variation of the first signal level; calculate a statistic in a predetermined first time period on the basis of the first variation within the first time period; and determine, on the basis of the statistic in the first time period, whether or not an interference source signal indicative of a signal of a radio wave coming from an interference source is included in the digital complex signals within the first time period.

17 Claims, 26 Drawing Sheets

(51) Int. Cl.
*H04B 1/04* (2006.01)
*H04B 1/16* (2006.01)
*H04W 16/14* (2009.01)

(58) Field of Classification Search
CPC ...... H04B 17/00; H04B 17/26; H04B 17/345; H04L 12/26; H04L 12/56; H04L 43/16; H04W 16/14; H04W 17/345; H04W 24/04
USPC ..... 375/219, 295, 316; 455/63, 67.11, 234.1
See application file for complete search history.

(56) References Cited

FOREIGN PATENT DOCUMENTS

| JP | 2000-224176 A | 8/2000 |
|---|---|---|
| JP | 2001-102966 A | 4/2001 |
| JP | 2002-111603 A | 4/2002 |
| JP | 2002-319946 A | 10/2002 |
| JP | 2007-060625 A | 3/2007 |
| JP | 2010-062805 A | 3/2010 |

OTHER PUBLICATIONS

IEEE Standards Association/IEEE Computer Society: "Part 11: Wireless LAN Medium Access Control (MAC) and Physical Layer (PHY) Specifications", IEEE Std 802.11™, The Institute of Electrical and Electronics Engineers, Inc., Mar. 2012, pp. 1-2793.

IEEE Standards Association/IEEE Computer Society: "Part 11: Wireless LAN Medium Access Control (MAC) and Physical Layer (PHY) Specifications; Amendment 4: Enhancements for Very High Throughput for Operation in Bands Below 6 GHz", IEEE Std 802.11ac™, The Institute of Electrical and Electronics Engineers, Inc., Dec. 2013, pp. 1-425.

\* cited by examiner

|  | $t_1$ | $t_2$ | $t_3$ | $t_4$ |
|---|---|---|---|---|
| $f_{ka}$ | $(p_{ka1})$ | $(p_{ka2})$ | $p_{ka3}$ | $p_{ka4}$ |
| $f_{kb}$ | $p_{kb1}$ | $p_{kb2}$ | $p_{kb3}$ | $p_{kb4}$ |
| $f_{kc}$ | $p_{kc1}$ | $p_{kc2}$ | $p_{kc3}$ | $p_{kc4}$ |

WITHIN INTERFERENCE SIGNAL RECEPTION PERIOD: $t_1$, $t_2$
OUT OF INTERFERENCE SIGNAL RECEPTION PERIOD: $t_3$, $t_4$ $P_{ka} = 2$
DUTY RATIO OF $f_{ka} = 2/3$

FIG. 15

| FREQUENCY $f_k$ | WITHIN INTERFERENCE SIGNAL RECEPTION PERIOD | | | OUT OF INTERFERENCE SIGNAL RECEPTION PERIOD |
|---|---|---|---|---|
| | $t_1$ | $t_2$ | $t_3$ | $t_4$ |
| SECOND BLOCK LEVEL | $p_{k1}$ | $p_{k2}$ | $p_{k3}$ | $p_{k4}$ |
| SECOND BLOCK LEVEL DIFFERENCE VALUE | $d_{k1}$ | $d_{k2}$ | $d_{k3}$ | $d_{k4}$ |
| SECOND BLOCK LEVEL COMPUTED VALUE | $c_{k1}$ | $c_{k2}$ | $c_{k3}$ | $c_{k4}$ |

FIG. 21

SIGNAL DETECTION DEVICE, WIRELESS COMMUNICATION DEVICE, AND WIRELESS COMMUNICATION TERMINAL

CROSS-REFERENCE TO RELATED APPLICATION (S)

This application is based upon and claims the benefit of priority from Japanese Patent Application No. 2016-119916, filed Jun. 16, 2016; the entire contents of which are incorporated herein by reference.

FIELD

Embodiments described herein relate generally to a signal detection device, a wireless communication device, and a wireless communication terminal.

BACKGROUND

A wireless communication device that uses a frequency band such as an ISM (Industrial Scientific and Medical) band may experience disturbance on wireless communications due to a radio wave generated by an interference source using the same frequency band such as a microwave oven and medical devices. In order to avoid such disturbances, it is necessary to detect a signal of a radio wave from an interference source from received radio signals and check presence or absence of the interference source.

As a method of detecting a signal of the radio wave from the interference source, some detection methods use the periodic nature of the operation of the interference source. For example, a microwave oven which is one of the interference sources can be classified into a transformer type and an inverter type on the basis of the driving system. Both types of microwave ovens emit radio waves by alternately repeating oscillation and stoppage of a magnetron inside of the microwave oven on the basis of the period (cycle) of an AC source that supplies power thereto. Accordingly, the signal of a radio wave from a microwave oven has a periodic nature. As a result, a signal of a radio wave from an interference source can be detected by detecting a signal having a periodic nature from received radio signals.

However, a drawback is that a signal has to be received for a plurality of times in order to determine the periodic nature of the signal and the time required for the detection is prolonged. Also, in the case of an inverter microwave oven inside of which switching is performed, the operation of the microwave oven may be temporarily stopped depending on the content and situation of cooking, making it difficult to correctly determine the periodic nature of the signal.

BRIEF DESCRIPTION OF THE DRAWINGS

FIG. 15 is a diagram for explanation of a method of calculation of a total number of threshold-exceeding block levels;

FIG. 21 is a diagram for explanation of a method of calculation of a weight coefficient;

DETAILED DESCRIPTION

Embodiments of the present invention are directed to detection of a signal of a radio wave that comes from an interference source on the basis of change in a signal level.

A signal detection device according to the embodiment of the present invention includes a memory and processing circuitry. The memory is configured to store a program. The processing circuitry is for executing the program and is configured to calculate a first signal level indicative of a signal level of a digital complex signal; calculate a first variation indicative of a temporal variation of the first signal level; calculate a statistic in a predetermined first time period on the basis of the first variation in the first time period; and perform determination, regarding whether or not an interference source signal indicative of a signal by a radio wave from an interference source is included in the digital complex signals in the first time period on the basis of the statistic in the first time period.

Embodiments of the present invention are described below with reference to the drawings. IEEE Std 802.11™-2012 and IEEE Std 802.11ac™-2013, which are known as wireless LAN standards, are incorporated by reference in this specification in their entirety.

First Embodiment

Figure 1:
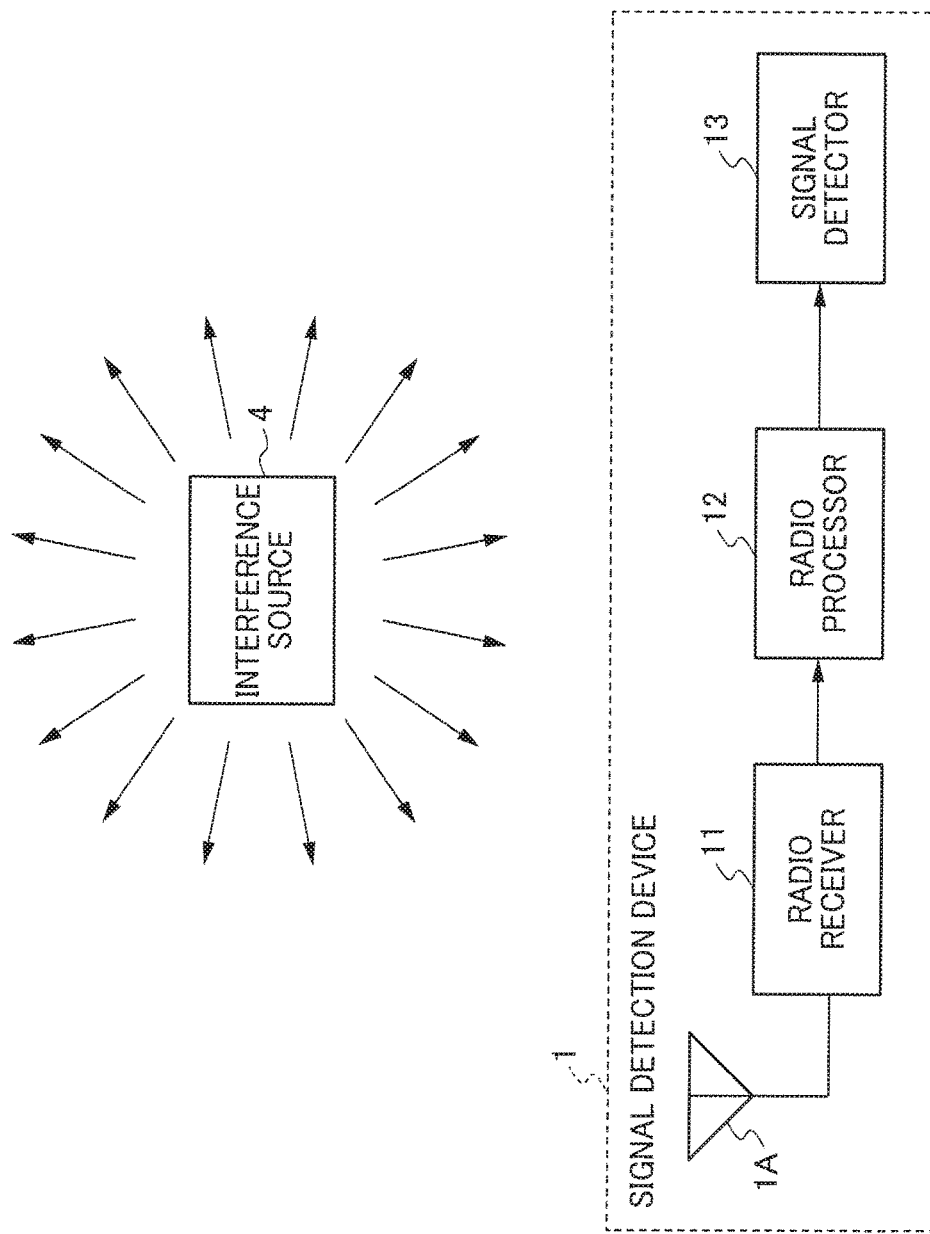
FIG. 1 is a block diagram illustrating an example of a schematic configuration of a wireless communication system in accordance with a first embodiment.

FIG. 1 is a block diagram that illustrates an exemplary schematic configuration of a wireless communication system in accordance with a first embodiment. It can be seen that at least a signal detection device 1 and an interference source 4 exist in the wireless communication system.

The signal detection device 1 includes an antenna 1A, a radio receiver 11, a radio processor 12, and a signal detector 13. The signal detection device 1 is configured to detect a signal of a radio wave that comes from the interference source 4 from among the received radio signals. In the following explanations, the signal of the radio wave from the interference source 4 is referred to as "interference source signal." It should be noted that the signal detection device 1 may output (data indicative of) presence or absence of the interference source 4 on the basis of the result of detection of the interference source signal. Also, when the interference source signal is detected, a transmission cycle (transmission period) of the interference source signal or the period in which the interference source signal is received may be calculated and output.

The interference source 4, which emits the radio wave, is a device, appliance, or equipment that may act as an interference source 4 of a wireless communication device that uses a high frequency range such as an ISM band. The high frequency range includes, but not limited to, 2.4 GHz, 5 GHz, and 60 GHz bands. In the following explanations, an inverter microwave oven is considered as the interference source 4. A magnetron inside of the inverter microwave oven alternately repeats oscillation and stoppage in synchronization with a cycle of an AC source that drives the microwave oven. The interference source signal thus generated has a cycle in synchronization with the cycle of the AC source. It should be noted that a period in which the interference source signal is transmitted in synchronization with the cycle of the AC source driving the interference source 4 is denoted as "interference source signal transmission period" in the following explanations.

Also, in the above consideration, the interference source signal transmission period includes a period during which the interference source signal is not transmitted due to switching carried out inside of the microwave oven. The frequency of the AC source that drives the microwave oven is either 50 Hz or 60 Hz. Meanwhile, since the frequency of switching is in the order of 50 kHz, a period in which an interference source signal having a very short width (in the order of several tens of microseconds) relative to the width of the interference source signal transmission period (in the order of several milliseconds) is not transmitted is included in the interference source signal transmission period. As a consequence, a signal level of the interference signal varies within the interference source signal transmission period.

It should be noted that the interference source 4 may be any device, appliance, or equipment such as an inverter microwave oven that can act as an interference source of the wireless communication device as long as a signal level of the interference source signal varies in the period during which the interference source signal is transmitted. For example, the interference source 4 may be a communication function suppression device (jammer).

It should be noted that wireless communication system of this embodiment may include another device, appliance, or equipment that emits a radio wave other than the interference source signal. Meanwhile, this embodiment considers a case where the interference source signal and the signal of the other radio wave do not interfere with each other. In the following explanations, the signal of the other radio wave is denoted as "the other signal."

Next, the internal configuration of the signal detection device 1 is described. The radio receiver 11 is configured to convert a radio signal received via the antenna 1A into a signal of the baseband (baseband signal) in accordance with the communication standard that the wireless communication system is compliant with.

Figure 2:
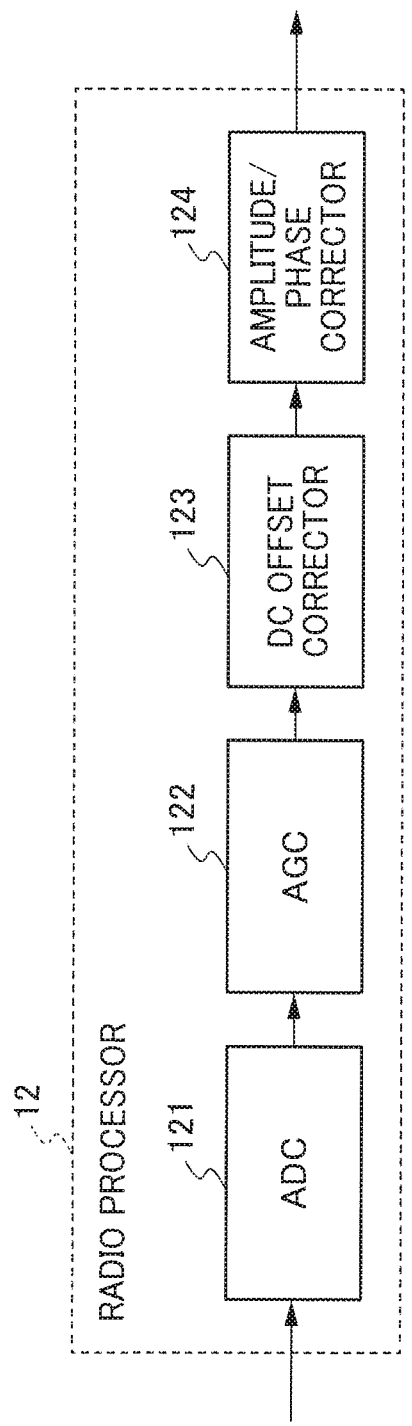
FIG. 2 is a block diagram illustrating an example of a schematic configuration of a radio processor in accordance with the first embodiment.

The radio processor 12 (digital complex signal generator) is configured to generate a digital complex signal (digital baseband signal) from the baseband signal that has been converted by the radio receiver 11. FIG. 2 is a block diagram that illustrates an exemplary schematic configuration of the radio processor 12 in accordance with the first embodiment. The radio processor 12 includes an ADC (analog-to-digital converter) 121, an AGC (automatic gain control) 122, a DC (direct current) offset corrector 123, and an amplitude/phase corrector 124.

The ADC 121 is configured to convert the analog signal input to the radio processor 12 into a digital signal. The AGC 122 is configured to perform dynamic gain correction for the digital signal. The DC offset corrector 123 is configured to correct leakage of a local oscillator associated with frequency conversion of the digital signal. The amplitude/phase corrector 124 is configured to correct imbalance between the amplitude and the phase of the digital signal. A digital complex signal is thus obtained. The digital complex signal is constituted by a digital I (in-phase) signal having the same phase as that of the received signal and a digital Q (quad-phase) signal that is 90 degrees out of phase with reference to the received signal.

Figure 3:
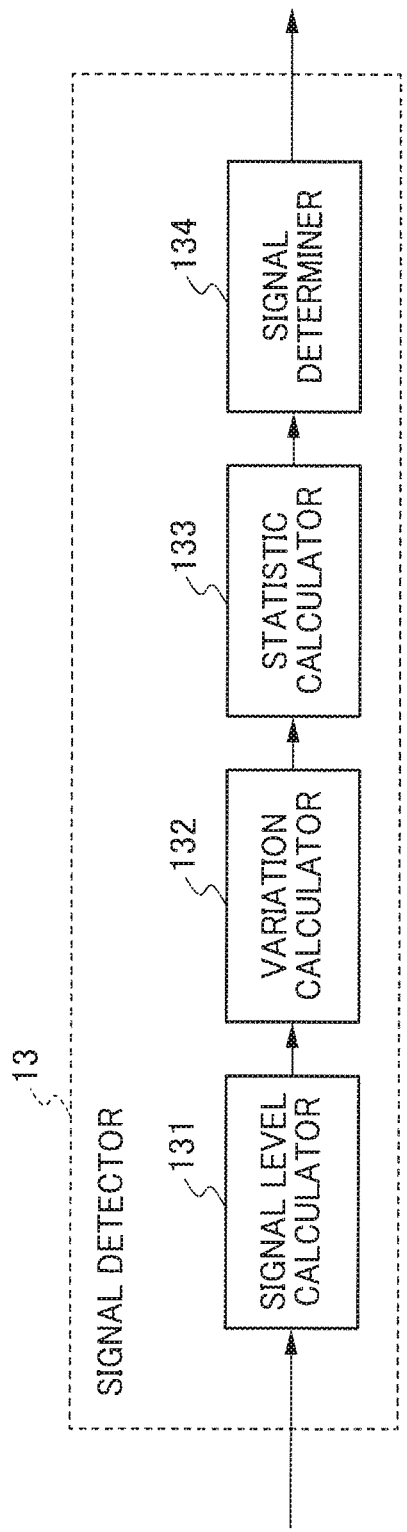
FIG. 3 is a block diagram illustrating an example of a schematic configuration of a signal detector in accordance with the first embodiment.

The signal detector 13 (processor) is configured to detect the interference source signal on the basis of the digital complex signal generated by the radio processor 12. It should be noted that, when the interference source signal is detected, the signal detector 13 may calculate the cycle (period) of the interference source signal and the period in which the interference source signal has been received. FIG. 3 is a block diagram that illustrates an exemplary schematic configuration of the signal detector 13 in accordance with the first embodiment. The signal detector 13 includes a signal level calculator 131, a variation calculator 132, a statistic calculator 133, and a signal determiner 134.

The signal level calculator 131 is configured to calculate a signal level (first signal level) of the digital complex signal input to the signal detector 13. The signal level includes a power value, an amplitude value, or a computed value computed on the basis of these values. Also, the signal level may be expressed as a true value, a log value, or the like.

The signal level calculator 131 is also configured to determine signal levels to be associated with each of predetermined a plurality of periods (second time periods). In the following explanations, the period at issue is denoted as "block" and the signal level that is associated with the block is denoted as "block level." The block level is calculated on the basis of the signal levels of the digital complex signals within the block.

The block level may be defined to be any one of the signal levels of the digital complex signals included in the block. Meanwhile, it is preferable that the block level is calculated on the basis of a plurality of signal levels. For example, the signal level calculator 131 calculates two or more signal levels of digital complex signals within each block for the respective blocks. Then, the signal level calculator 131 calculates a sum or average value of the two or more signal levels to define the calculated sum or average value as the block level. By virtue of this, the influence due to noise or the like included in the digital complex signal is reduced and a smoothed block level is calculated.

It should be noted that two adjacent blocks may have time periods that overlap with each other. Also, there may be a gap between two adjacent blocks. However, it is preferable that the length of each block is defined such that changes of the signal level due to switching are allowed to be discriminated.

For example, if two adjacent blocks do not have any time periods overlapping with each other and no gap exists between these two adjacent blocks, it is preferable that the length of the blocks is defined to be less than a half cycle of the switching frequency. For example, if the frequency of the switching is 50 kHz, then the length of the blocks should be defined to be less than 10 microseconds. As a consequence, a section is created where a block having a high block level neighbors another block having a low block level. By virtue of this, the variation calculated by the variation calculator 132, which will be described later, becomes large.

It should be noted that, although the above-described block level is calculated from the digital complex signal which is a temporal signal, the block level may be calculated from a frequency signal. For example, time-frequency transform such as Short-time Fourier Transform (STFT) may be carried out after the analog-to-digital conversion by the ADC 121 and the block level may be calculated on the basis of the signal levels of samples (frequency signals) for each transform cycle. For example, a total of the signal levels of the samples within the transform cycle may be defined as the block level.

Figure 4:
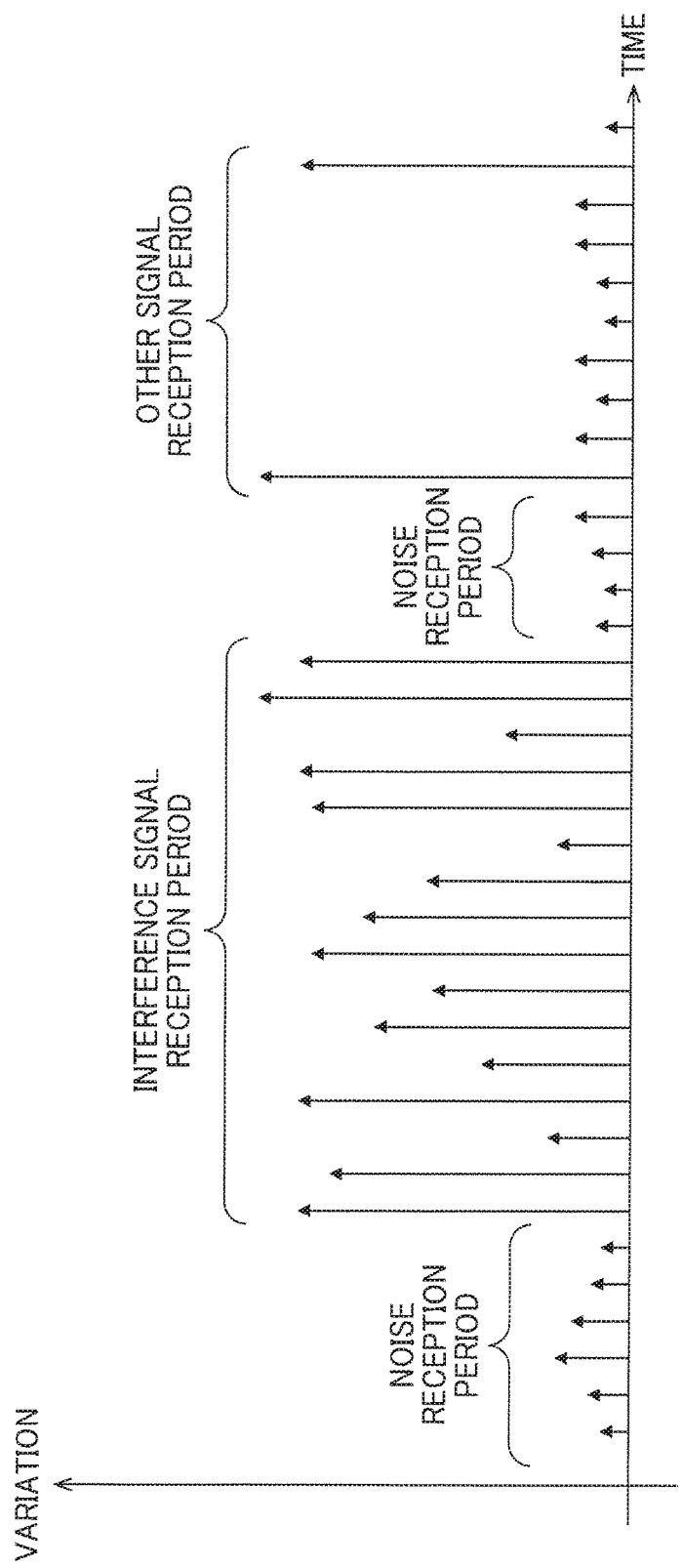
FIG. 4 is a diagram illustrating an example of a time series graph of a variation calculated by a variation calculator.

The variation calculator 132 is configured to calculate a temporal variation (first variation) of the block level calculated by the signal level calculator 131. FIG. 4 is a diagram that illustrates an example of a time series graph of a variation calculated by the variation calculator 132. The temporal variation indicated by the vertical axis of FIG. 4 is obtained by an absolute value of the difference between the block levels of two adjacent blocks if the second block level is expressed by a log value. Also, the variation may be expressed by a ratio. In the time series graph of the variation includes an interference source signal reception period in which the interference source signal is included, another signal reception period in which other signals are included, and a noise reception period in which noise is included. The length of the interference source signal reception period is identical with the length of the interference source signal transmission period.

Since the noise or the like has been smoothed in the course of calculation of the block level, the variation in the noise reception period does not take a very large value. The variation in the other signal reception period does not take a very large value either, except for the rising timing and falling timing of the signal in the same manner as in the noise reception period. Meanwhile, the variation in the interference source signal reception period takes a larger value over the entire interference source signal reception period due to change in the block level by switching.

Although block levels of two adjacent blocks are compared in FIG. 4, the variation may be calculated using blocks that do not neighbor each other as long as it is possible to recognize the change in the block level.

The statistic calculator 133 is configured to calculate a statistic in a predetermined time period (first time period) on the basis of one or more variations calculated by the variation calculator 132 within the predetermined time period. In the following explanations, the period at issue is denoted as "statistic definition interval." It is assumed here that one or more statistic definition intervals exist. The statistic in the statistic definition interval is calculated from, for example, an average a variance, a probability density function, a histogram, or the like of the variations within the statistic definition interval.

When the block level rapidly changes, the average, variance, probability density function, and histogram of the variations exhibit a large value or a singular shape. Hence, when the statistic is determined on the basis of the average, variance, probability density function, histogram, or the like, it is made possible to recognize a change in the block level even when the block level changes rapidly. Also, model matching may be carried out to calculate a matching degree with respect to a predetermined normative model and the matching degree may be defined as the statistic.

Also, the statistic may be defined to be the number of variations larger than a threshold applied to the variations among the variations within the statistic definition interval. In the following explanations, the threshold is denoted as "variation threshold." The value of the variation threshold may be calculated from an average of all or part of the variations within the statistic definition interval, variance, probability density function, histogram or the like of the variations within the statistic definition interval. Alternatively, the value of the variation threshold may be defined as appropriate. It should also be noted that one single variation threshold may be used or a plurality of variation thresholds may also be used. For example, the statistic may be defined as "2" if one variation exceeds both of the variation thresholds based on the average and the variation threshold based on the variance.

A plurality of methods may be considered to determine the statistic definition interval. For example, a predetermined time period may be divided into a plurality of intervals, and each of the intervals obtained by the division may be defined as the statistic definition interval. Also, the statistic definition interval may be defined on the basis of the magnitude of the signal level. For example, a time period in which the signal level calculated by the signal level calculator 131 exceeds a predetermined threshold may be defined as the statistic definition interval. It is not likely that there exists an interference source signal within a period in which the signal level is low. Accordingly, the statistic definition interval is not defined with regard to a period in which the signal level is low, so that it is made possible to reduce the processing load and shorten the processing time and achieve more accurate detection of the interference source signal. It should be note that, when the statistic definition interval is to be defined on the basis of the magnitude of the signal level, the statistic definition interval is to be defined by the width (milliseconds) of the cycle of the interference source signal, in other words, the width of the cycle of an AC source that drives the interference source 4. In addition, the short period in the order of several tens of microseconds in which interference source signal does not appear due to the switching is to be ignored.

Also, when a plurality of statistic definition intervals are defined, two adjacent statistic definition intervals may have time periods that overlap with each other, and there may be a gap between two adjacent statistic definition intervals.

However, the length of the statistic definition interval should be taken into account. For example, in the case the switching frequency is 50 kHz, when the statistic definition interval is defined to be 20 microseconds or longer, a variation will be included in the statistic definition interval, the variation taking a large value and indicating rapid increase or decrease in the signal level due to the switching being enabled and disabled. As a result, the influences of these portions are reduced even when there exists a section where a variation does not take a very large value within the interference source signal reception period. Also, the influences of these portions are reduced even when there exists a section where an unexpectedly large variation occurs within the other signal reception period or the noise reception period. As such, it is preferable that the length of the statistic definition interval is one cycle of the switching or longer than that.

Also, when a predetermined time period is divided into a plurality of intervals and each of the intervals obtained by the division is defined as the statistic definition interval, it is preferable that the length of the statistic definition interval is as short as possible insofar as it is larger than the lower limit upon the length of the statistic definition interval. When the statistic definition interval overlaps with both of the interference source signal reception period and the other signal reception period, then both of the interference source signal and the other signal have influences upon the statistic, so that it may happen that the accuracy of detection of the interference source signal within the statistic definition interval is degraded. Also, when the interference source signal reception period is to be calculated, the accuracy of the interference source signal reception period is increased as the predetermined time period is more finely divided into the intervals, in other words, when the length of the statistic definition interval becomes shorter. The lower limit applied to the length of the statistic definition interval is defined based on the definition of the block, e.g., the length of the block. This is because, when the length of the statistic definition interval becomes lower than the lower limit, it will become difficult to satisfy a condition in the processing associated with the signal determiner 134, which will be later described, the condition being that the period in which the statistic exceeds the threshold thereof is equal to or longer than a predetermined-length time.

Also, for example, in the case the interference source 4 is operating with AC source with the commercial power frequency of 50 Hz, in other words, when the cycle of the interference source signal is 20 milliseconds, when the length of the statistic definition interval is defined to be 20 milliseconds or longer, the interference source signal of the second cycle will be included, so that it is made impossible to accurately calculate the interference source signal reception period. Hence, it is preferable that the length of the statistic definition intervals is defined to be less than one cycle of the interference source signal.

The signal determiner 134 is configured to determine whether or not the interference source signal is included in the digital complex signals on the basis of the statistic in the statistic definition interval calculated in the statistic calculator 133. Specifically, when the length of the time period in which the statistic exceeds the threshold applied to the statistic is equal to or longer than a predetermined-length time, it is determined that the interference source signal is included in this time period. In the following explanations, the threshold value at issue is denoted as "statistic threshold value." The value of the statistic threshold value may be defined as appropriate.

Figure 5:
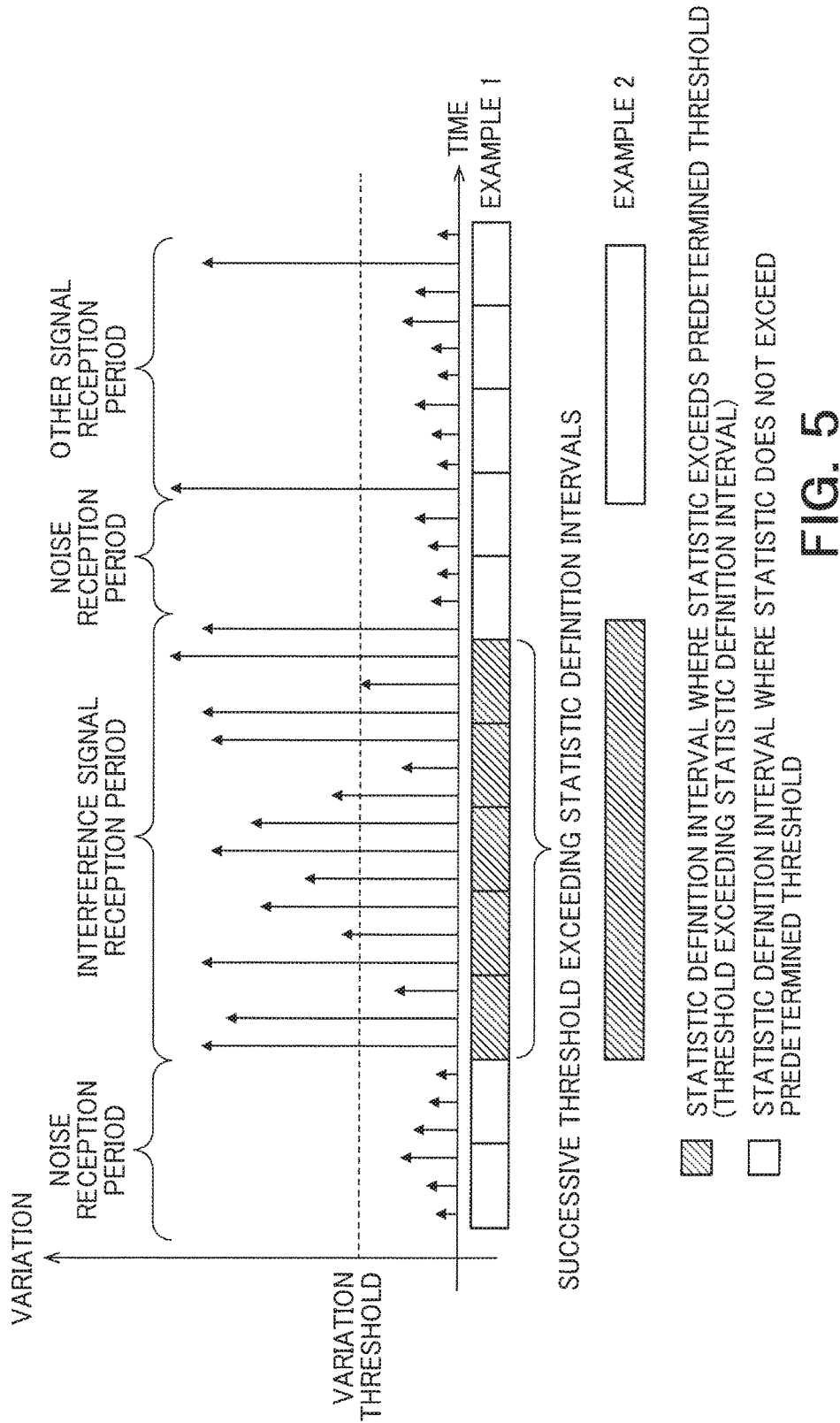
FIG. 5 is a diagram for explanation of determination by a signal determiner.

FIG. 5 is a diagram that illustrates the determination made by the signal determiner 134, in which the statistic definition intervals are defined with regard to the output example illustrated in FIG. 4. According to Example 1 of the statistic definition intervals, an example is illustrated where a predetermined time period is divided into a plurality of intervals, each of which is defined as the statistic definition interval. Accordingly, in Example 1, any two adjacent statistic definition intervals do not have time periods overlapping with each other and there is no gap between any two adjacent statistic definition intervals.

According to Example 2 of the statistic definition intervals, an example is illustrated where the statistic definition intervals are defined on the basis of the signal levels calculated by the signal level calculator 131. According to Example 2, no statistic definition interval is defined for a noise reception period where the signal level is low. By contrast, statistic definition intervals are defined which coincide with two periods where the signal level is high, respectively, i.e., the interference source signal reception period and the other signal reception period. Accordingly, according to Example 2, a gap is created between the two adjacent statistic definition intervals.

The signal determiner 134 checks whether or not the statistic exceeds the statistic threshold value in each statistic definition interval. The black statistic definition intervals illustrated in FIG. 5 each indicate a statistic definition interval in which the statistic exceeds the statistic threshold value. The white statistic definition intervals illustrated in FIG. 5 each indicate a statistic definition interval in which the statistic does not exceed the statistic threshold value. In the following explanations, the statistic definition interval in which the statistic exceeds the statistic threshold value is denoted as "threshold-exceeding statistic definition interval." Also, the signal determiner 134 compares the length of the threshold-exceeding statistic definition interval with a predetermined-length time.

When the length of the threshold-exceeding statistic definition interval is longer than the predetermined-length time, then the signal determiner 134 defines the threshold-exceeding statistic definition interval as the period in which the statistic exceeds the statistic threshold value, and determines that the interference source signal exists within the threshold-exceeding statistic definition interval.

Meanwhile, when the length of the threshold-exceeding statistic definition interval is shorter than the predetermined-length time, then a total amount of the lengths of the successive threshold-exceeding statistic definition intervals is defined as the period in which the statistic exceeds the statistic threshold value. When the total amount of the lengths of the successive threshold-exceeding statistic definition intervals exceeds the predetermined-length time, then it is determined that the interference source signal exists within the successive threshold-exceeding statistic definition intervals. Here, as in Example 1 of FIG. 5, threshold-exceeding statistic definition intervals are defined to be successive if two adjacent threshold-exceeding statistic definition intervals do not have time period overlapping with each other and there is no gap between the two adjacent threshold-exceeding statistic definition intervals. In this manner, the signal detection device 1 detects the interference source signal.

Also, one threshold-exceeding statistic definition interval or successive threshold-exceeding statistic definition intervals substantially coincide with the interference source signal reception period. Accordingly, the signal determiner 134 can calculate the interference source signal reception period.

Also, the transmission cycle of the interference source signal can be calculated from the calculated first-round interference source signal reception period and the calculated second-round interference source signal reception period.

As described above, the signal detection device 1 of this embodiment can detect the interference source signal when the signal detection device 1 receives the interference source signal for predetermined-length time or over, the predetermined-length time being necessary for the signal determiner 134 to perform the determination. In contrast, a detection method that uses the periodic nature of the interference source signal needs to measure the rise and the like of the interference source signal for a plurality of times in order to determine that the signal is a periodic signal. Therefore, it takes longer time than the signal detection device 1 of this embodiment until the interference source signal is detected.

For example, it is assumed that there exists an inverter microwave oven which is turned on for T seconds and which is turned off for T seconds due to the AC source that drives the interference source 4, that is, the inverter microwave oven which whose duty ratio is 50%. Further, it is assumed that the detection method that uses the periodic nature of the interference source signal is allowed to determine the periodic nature when it performs three times of measurement for the T seconds from the rise to the fall of the interference source signal. In this case, the detection method using the periodic nature will take 5T seconds to detect the interference source signal. On the other hand, according to this embodiment, the interference source signal can be detected when only one round of measurement is performed for T seconds at longest from the rise to the fall of the interference source signal. Hence, the time required to detect the interference source signal is T seconds at longest, which means that the detection time can be reduced to a fifth of the former detection method.

Figure 6:
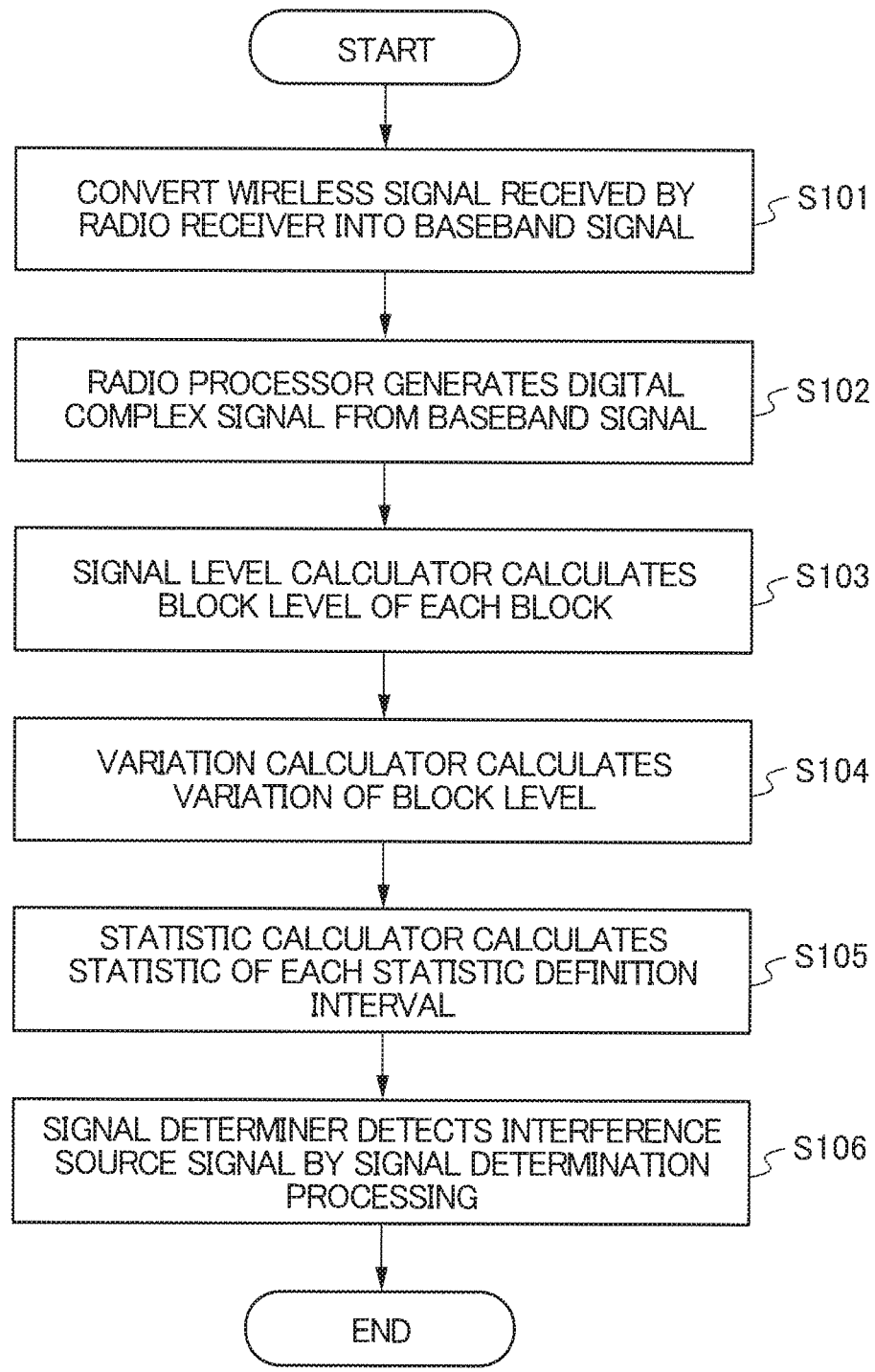
FIG. 6 is a diagram illustrating an example of a flowchart of schematic processing in a signal detection device in accordance with the first embodiment.

FIG. 6 is a diagram that illustrates an example of a flowchart of schematic processing in the signal detection device 1 in accordance with the first embodiment. This flow is started when the radio receiver 11 receives the radio signal. The radio receiver 11 converts the received radio signal into a signal of the baseband (S101). The signal of the baseband obtained by the conversion is input to the radio processor 12 and the radio processor 12 generates a digital complex signal from the signal of the baseband (S102). The digital complex signal is input to the signal detector 13.

The signal level calculator 131 of the signal detector 13 calculates the block levels in the respective blocks from the digital complex signals (S103). The variation calculator 132 of the signal detector 13 compares the calculated block levels with each other and calculates the variations of the block levels (S104). The statistic calculator 133 of the signal detector 13 calculates a statistic in a statistic definition interval on the basis of the calculated variations and the variation threshold (S105). The signal determiner 134 of the signal detector 13 performs the signal determination processing and detects the interference source signal (S106).

Figure 7:
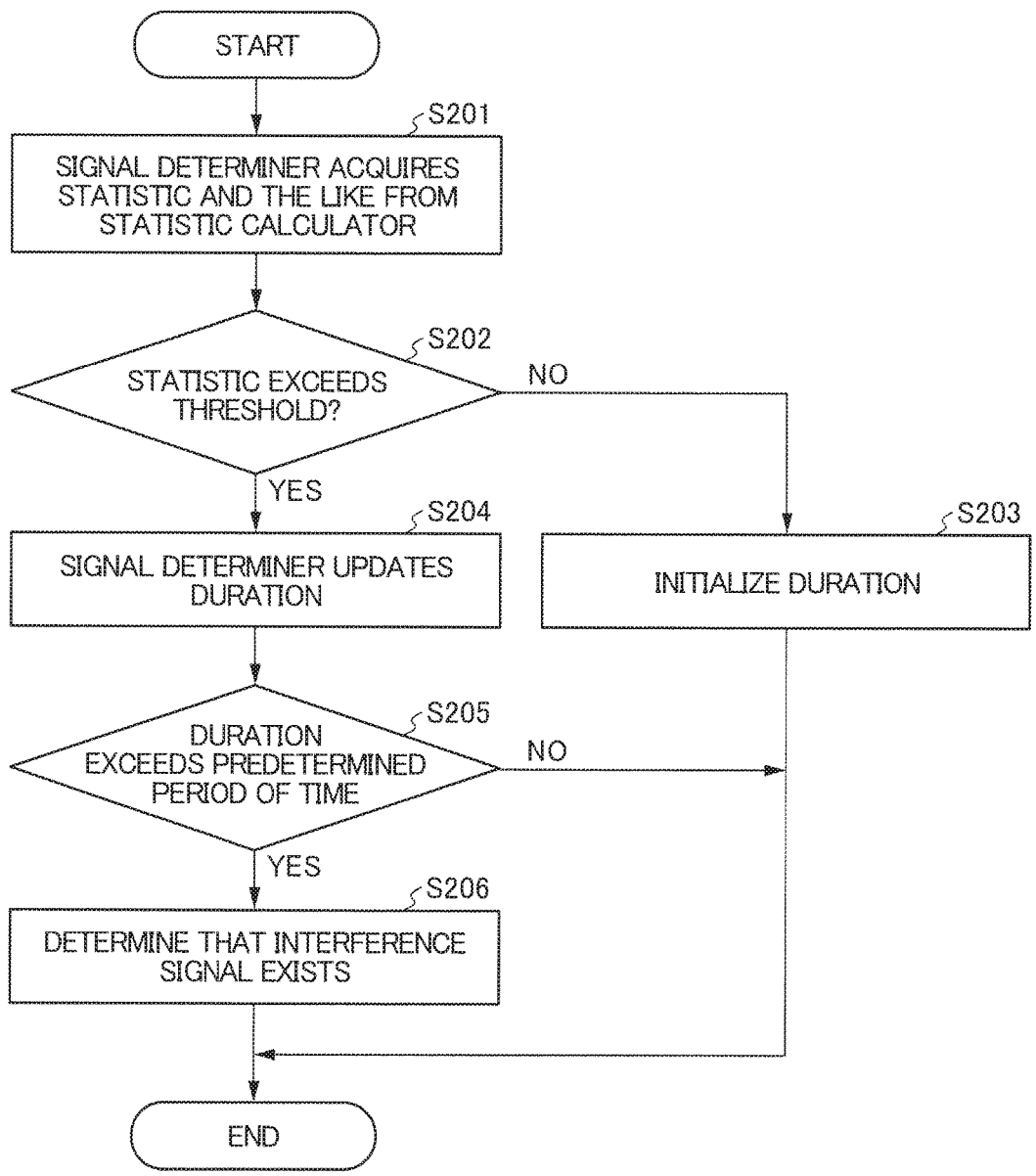
FIG. 7 is a diagram illustrating an example of a flowchart of signal determination processing in a signal determiner in accordance with the first embodiment.

FIG. 7 is a diagram that illustrates an example of a flowchart of signal determination processing in the signal determiner 134 in accordance with the first embodiment. This flow is performed for each statistic definition interval and repeated until all the statistic definition intervals are subjected to the processing. Also, the signal determiner 134 holds a duration time for measuring the time during which the statistic exceeds the statistic threshold value. The initial value of the duration time is zero (0).

The signal determiner 134 collects information such as a statistic from the statistic calculator 133 (S201). When the acquired statistic does not exceed the statistic threshold value (NO in S202), the signal determiner 134 initializes the duration time (S203), in other words, clears the value of the duration time to zero. Then, the flow is terminated to proceed to the next processing of the statistic definition interval. When the statistic exceeds the statistic threshold value (YES in S202), the signal determiner 134 adds the length of the statistic definition interval to the duration time and thus updates the duration time (S204). The signal determiner 134 checks whether or not the updated duration time exceeds the predetermined-length time. If the updated duration time does not exceed the predetermined-length time (NO in S205), the signal determiner 134 does not perform any processing and the flow is terminated. When the statistic threshold value is exceeded (YES in S205), it is determined that the interference source signal exists (S206). This is the flow of the signal determination processing.

It should be noted that, when the signal determiner 134 calculates the interference source signal reception period, the signal determiner 134 records, at the time of updating of the duration time, the statistic definition interval in which the statistic exceeded the threshold, and initializes, at the time of initialization of the duration time, the recorded statistic definition interval. By virtue of this, after the processing is completed for all the statistic definition intervals, the recorded statistic definition interval as it is becomes the interference source signal reception period.

As has been described in the foregoing, according to this embodiment, the variation of the signal level regarding the received radio signal is calculated and the statistic in the statistic definition interval is calculated. Then, presence or absence of the interference source signal, the interference source signal reception period, the transmission cycle of the interference source signal, and the like are calculated on the basis of the statistic. When determination is to be made simply from the block level, it is difficult to discriminate the interference source signal from the other signal. However, when the determination is to be made, as proposed by this embodiment, with reference to the statistic based on the variation of the block level, it is made possible to discriminate the interference source signal from the other signal and detect the interference source signal.

Second Embodiment

It is assumed in the first embodiment that there exists no other signal at the time of reception of the interference source signal. In this embodiment, it is assumed that there exists the other signal at the time and the interference source signal is to be detected despite the existence of the other signal. Explanations of the same or similar aspects as those described in the context of the embodiment are not repeated here.

Figure 8:
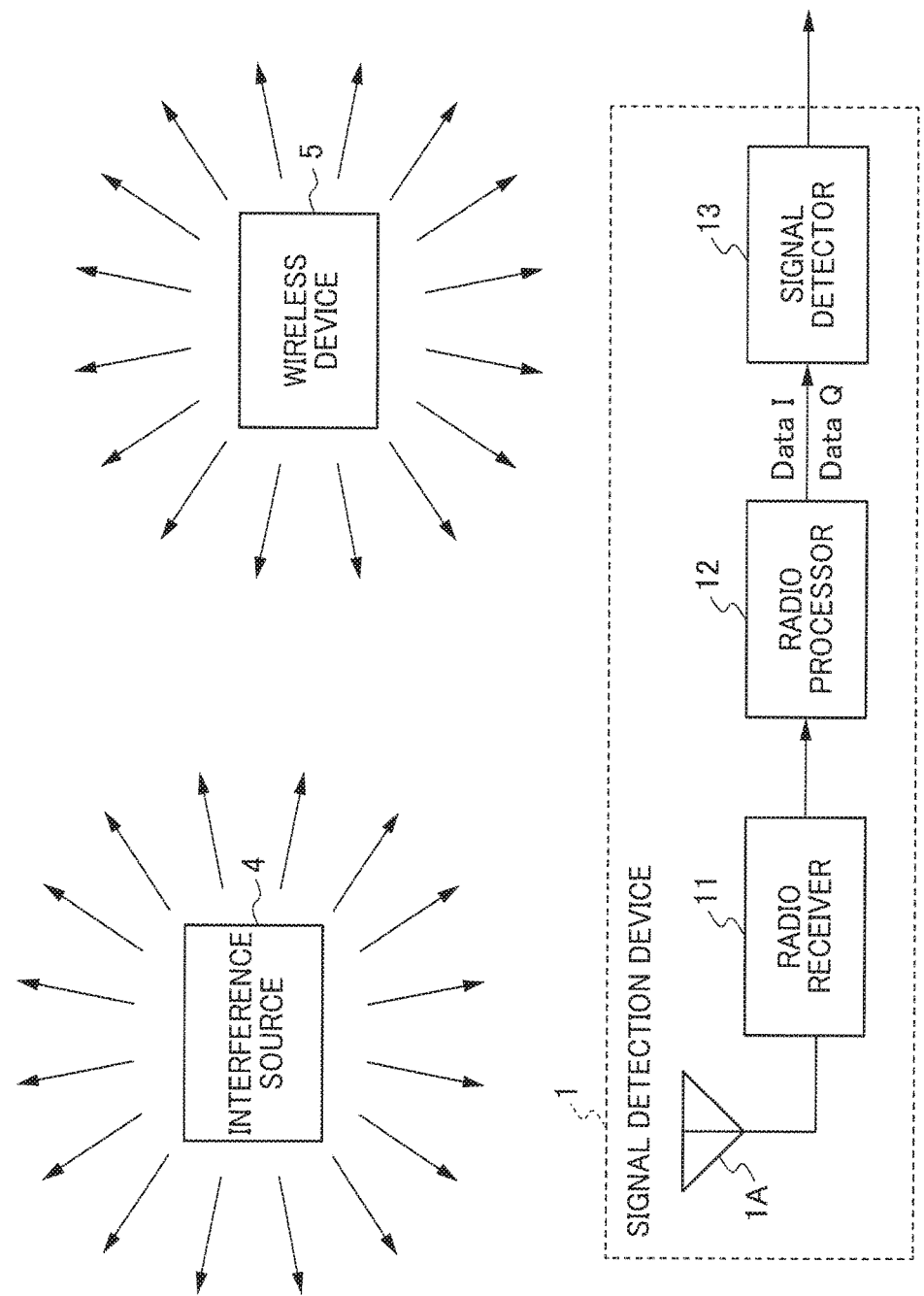
FIG. 8 is a block diagram illustrating an example of a schematic configuration of a wireless communication system in accordance with a second embodiment.

FIG. 8 is a block diagram that illustrates an example of the schematic configuration of the wireless communication system that includes the signal detection device 1 in accordance with a second embodiment. The other signal is emitted by the other wireless device 5 either in the same channel as that of the interference source signal or in an adjacent channel that is adjacent to the channel of the interference source signal, or within a monitor frequency band of the signal detection device 1. The other signal may include, for example, a wireless communication signal compliant with a wireless LAN standard. It should be noted that a plurality of other wireless devices 5 may exist in the wireless communication system.

Figure 9:
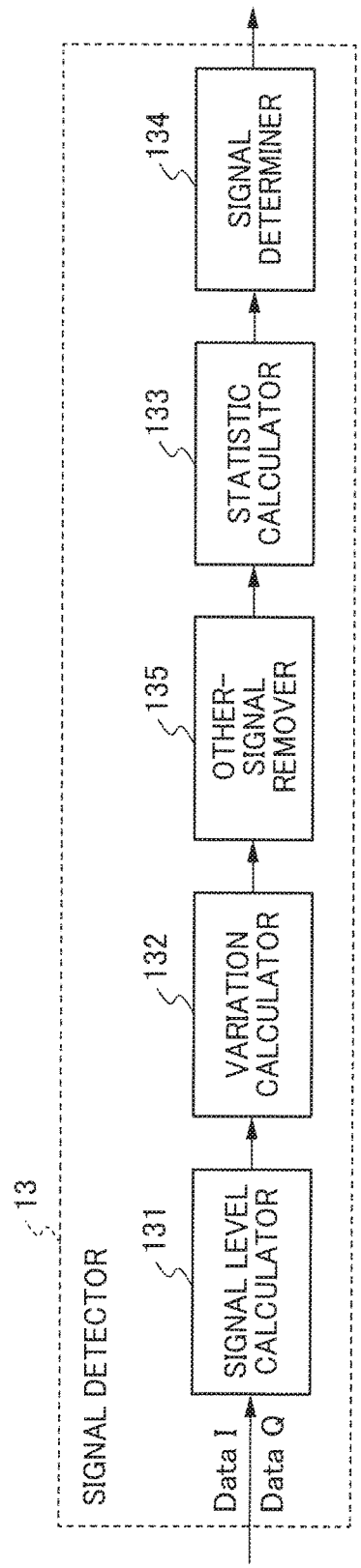
FIG. 9 is a block diagram illustrating an example of a schematic configuration of a signal detector in accordance with the second embodiment.

FIG. 9 is a block diagram that illustrates the schematic configuration of the signal detector 13 in accordance with the second embodiment. The signal detector 13 in accordance with this embodiment further includes an other-signal remover 135.

Figure 10:
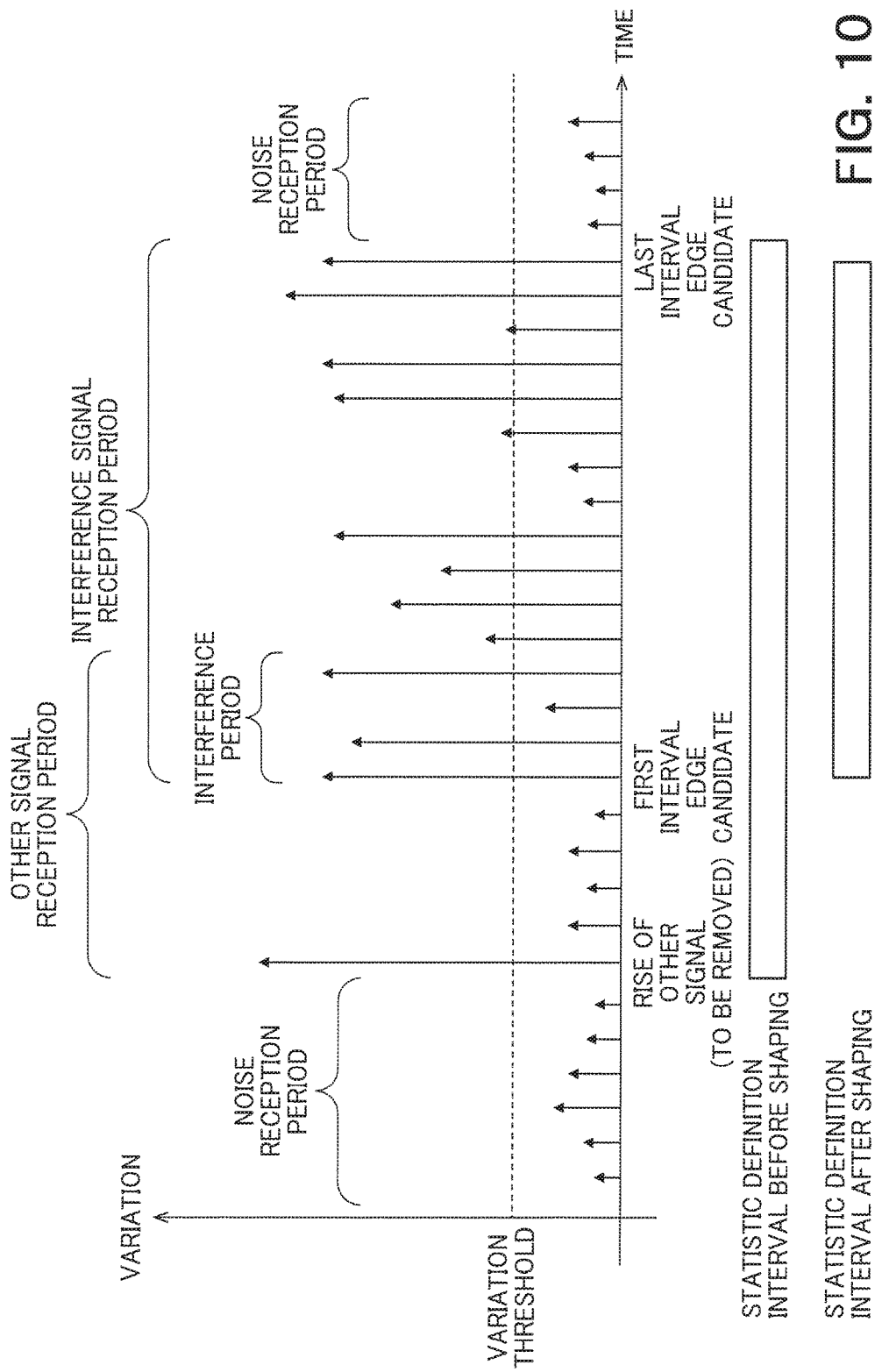
FIG. 10 is a diagram illustrating an example of output by a variation calculator in accordance with the second embodiment.

The other-signal remover 135 is configured to remove a variation due to the other signal from the variations calculated by the variation calculator 132. FIG. 10 is a diagram that illustrates an example of output by the variation calculator 132 in accordance with the second embodiment. For example, it is assumed that the interference source 4 starts its operation prior to completion of transmission of the other signal from the other wireless device 5. In this case, the time point of fall of the other signal is included in the interference source signal reception period, making it difficult to discriminate the interference source signal reception period from the other signal reception period, which in turn may cause the interference source signal reception period to be calculated as being longer than its actual length. In view of this, the other-signal remover 135 performs removal of the other signal.

As has been discussed in the foregoing, the variation calculated by the variation calculator 132 takes a high value at the both time points, i.e., the time point of rising and the time point of fall of the other signal. Accordingly, in terms of the variation, the other signal can be regarded as impulsive noise for the interference source signal. In view of this, the other-signal remover 135, in order to remove the impulsive noise, performs filter processing for the variation by a median filter, a weighted median filter, or a switching median filter including any appropriate number of taps. The number of taps of the filter is determined on the basis of the number of blocks that include the rise of the other signal that should be removed or the number of blocks that include the fall thereof.

For example, when two adjacent blocks do not have time periods overlapping with each other and there is no gap between the two adjacent blocks, the block level at the rise or fall of the other signal gradually changes like a ramp function. Meanwhile, the variation will reside within at most two blocks unless the length of the blocks is lower than the lower limit. In other words, there will exist at most two variations taking a high value by the rise or fall of the other signal. In the case of a median filter, if there are two variations taking a high value, comparison of three or more variations with a variation taking a low value will lead to the median of a low value, making it possible to remove a variation that takes a high value. Accordingly, the other signal can be removed by a median filter whose the number of taps is five or over. In this manner, the other signal can be removed by removing a section where the variations of the high value appear only sparsely in terms of time.

It will be appreciated that the filter also removes part of the interference source signal. However, this is not problematic because there are numerous variations due to the interference source signal exceeding the variation threshold.

The statistic calculator 133 performs the same processing as in the first embodiment for the outputs by the other-signal remover 135, in other words, for the variations that have been subjected to the filter processing. Meanwhile, when the statistic definition interval is determined on the basis of the signal level calculated by the signal level calculator 131, it may happen, for example, that the section starting from the beginning of the other signal reception period and extending to the end of the interference source signal reception period is defined as one single statistic definition interval. Accordingly, in the above case, the statistic calculator 133 performs shaping of the statistic definition interval.

The statistic calculator 133 determines the beginning and the end of the statistic definition interval after the shaping. The beginning and the end are selected from the respective time points at which the variations exceeded the variation threshold within the statistic definition interval prior to the shaping. In the following explanations, the time points at which the variations exceeded the variation threshold within the statistic definition interval prior to the shaping are denoted as "interval edge candidate."

For example, an interval edge candidate that occurred at the earliest time point among the interval edge candidates is defined as the beginning of the statistic definition interval after the shaping. Then, it is checked whether a next earliest interval edge candidate following the interval edge candidate defined as the beginning satisfies a predetermined condition (first condition) to determine whether or not the next earliest interval edge candidate becomes the end. If the next earliest interval edge candidate does not become the end, then a next earliest interval edge candidate following the previous one is checked. This is repeated to determine the end.

One of the predetermined conditions requires that a time point of an interval edge candidate following a target interval edge candidate should exceed a predetermined-length time from the time point of the target interval edge candidate. In other words, if there is no time point at which the variation exceeds the variation threshold for a while at and after the target interval edge candidate, then this interval edge candidate is determined as the end. Another predetermined condition requires that the time point of the interval edge candidate should fall within a predetermined-length time from the time point of the interval edge candidate determined as the beginning. This condition ensures that the statistic definition interval is not extended too much. It should be noted that the predetermined-length time in the above respective conditions may be same or different.

When any interval edge candidate remains at and after the end of the statistic definition interval after the shaping, the statistic calculator 133 repeats the same or similar methodology and generates a new statistic definition interval. In this manner, the statistic definition interval is shaped. FIG. 10 illustrates the statistic definition interval prior to the shaping and the statistic definition interval after the shaping. The variation at the time point of the rise of the other signal illustrated in FIG. 10 is already removed by the filter processing by the other-signal remover 135. Accordingly, the first time point at which a variation exceeds the variation threshold serves as the first interval edge candidate in the interference source signal reception period. This makes it possible to generate a statistic definition interval from which unnecessary period is removed, and calculate the interference source signal reception period as in the same or similar manner as in the first embodiment.

Figure 11:
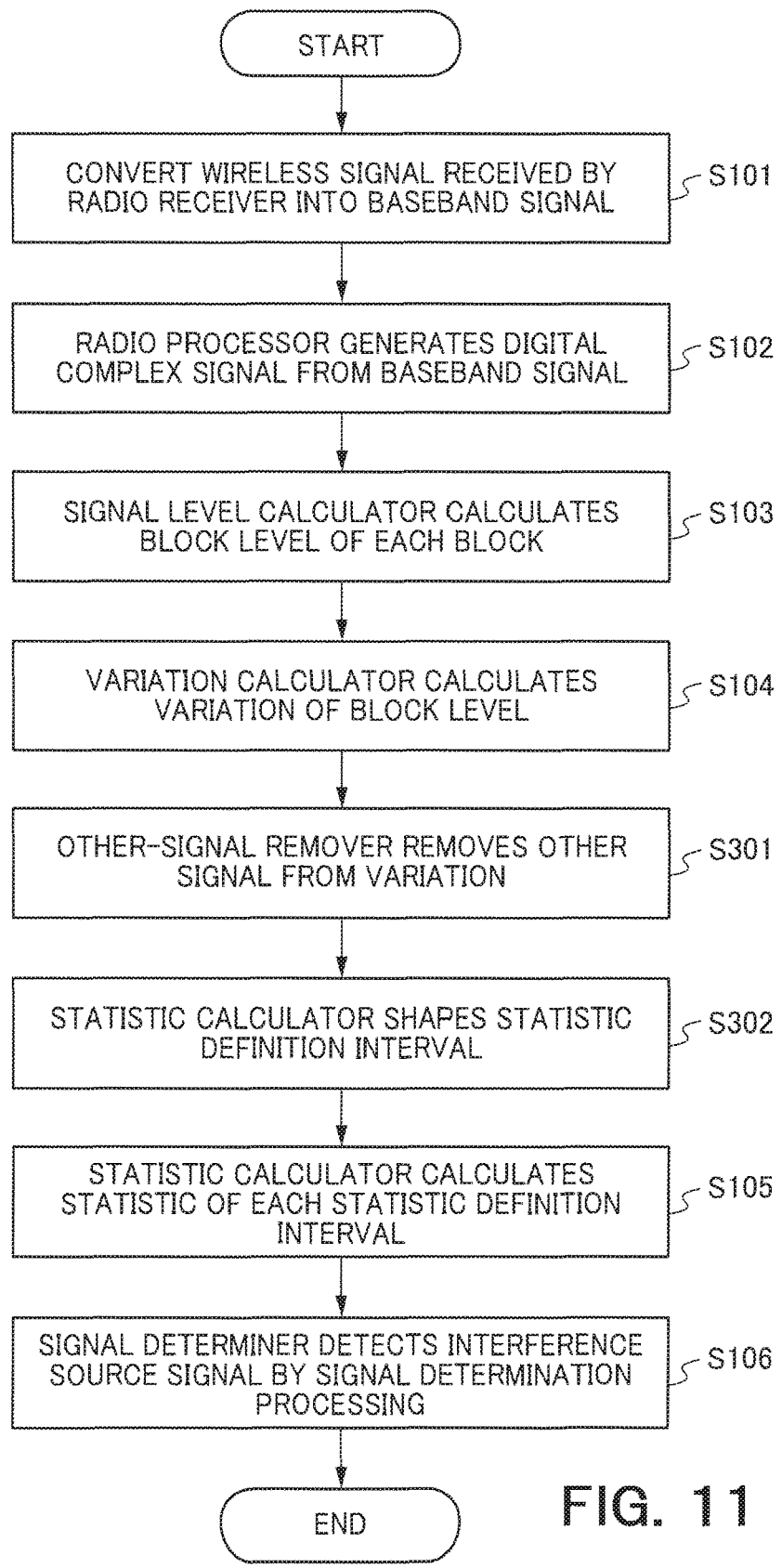
FIG. 11 is a diagram illustrating an example of a flowchart of schematic processing in a signal detection device in accordance with the second embodiment.

FIG. 11 is a diagram that illustrates an example of a flowchart of schematic processing in the signal detection device 1 in accordance with the second embodiment. The processing steps from S101 to S104 are identical to those in the schematic processing in the signal detection device 1 in accordance with the first embodiment. After the processing step where the variation calculator 132 calculates the variation of the block level (S104), the other-signal remover 135 removes the other signal from the variation calculated by the variation calculator 132 (S301). The statistic calculator 133 then calculates the interval edge candidate on the basis of the variation from which the other signal has been removed, and shapes the statistic definition interval on the basis of the interval edge candidate (S302). The subsequent processing steps (S105 and S106) proceed in the same or similar manner as in the first embodiment.

As has been described in the foregoing, according to this embodiment, when the other wireless device 5 that transmits the other signal resides within the same wireless communication system as that of the interference source 4, the other signal is removed as the impulsive noise. This improves the tolerance of the signal detection in relation to the other signal.

Third Embodiment

Figure 12:
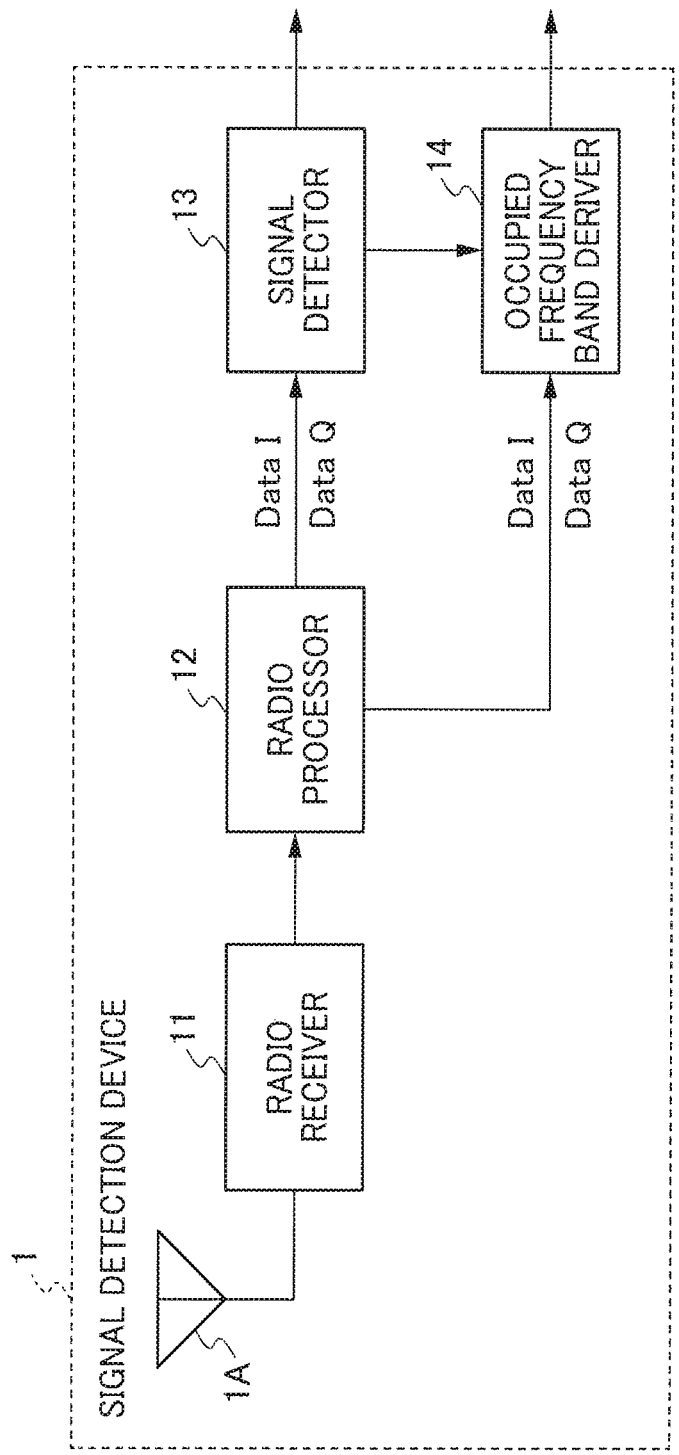
FIG. 12 is a block diagram illustrating an example of a schematic configuration of a signal detection device in accordance with a third embodiment.

The signal detection device 1 of this embodiment derives an occupied frequency band of the interference source signal. FIG. 12 is a block diagram that illustrates an example of the schematic configuration of the signal detection device 1 in accordance with a third embodiment. The signal detection device 1 in accordance with this embodiment further includes an occupied frequency band deriver 14. Explanations of the same or similar aspects as those in the preceding embodiments are not repeated here. Although the signal detector 13 and the occupied frequency band deriver 14 are separately illustrated for the sake of explanation, the signal detector 13 may incorporate the occupied frequency band deriver 14.

Figure 13:
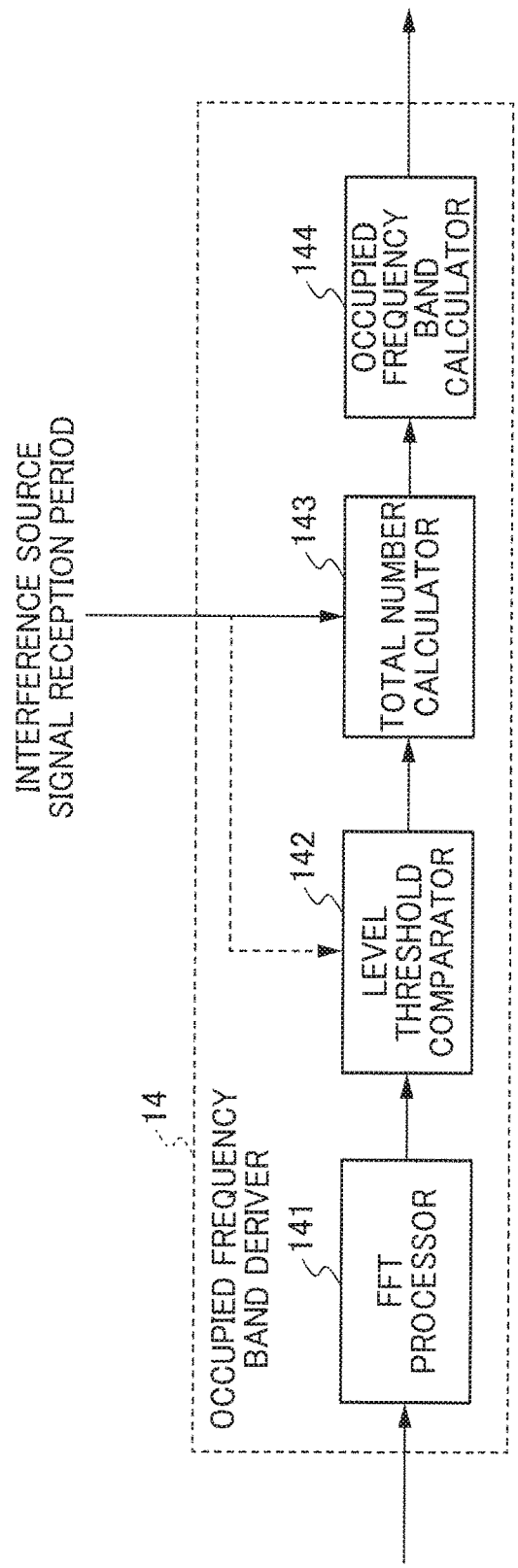
FIG. 13 is a block diagram illustrating an example of a schematic configuration of an occupied frequency band deriver in accordance with the third embodiment.

The occupied frequency band deriver 14 derives the occupied frequency band of the interference source signal on the basis of the digital complex signal generated by the radio processor 12 and on the basis of the statistic definition interval in which the interference source signal has been detected by the signal detector 13, in other words, the interference source signal reception period. FIG. 13 is a block diagram that illustrates an example of the schematic configuration of the occupied frequency band deriver 14 in accordance with the third embodiment. The occupied frequency band deriver 14 includes an FFT (Fast Fourier Transform) processor 141, a level threshold comparator 142, a total number calculator 143, and an occupied frequency band calculator 144.

The FFT processor 141 performs, in each of the predetermined time periods (third time period), Fourier transform (FFT) of the digital complex signal in the corresponding period into a frequency signal. In addition, the FFT processor 141 calculates the signal level (second signal level) of the frequency signal. The period may be identical to the block used by the signal level calculator 131 or different than that. In the following explanations, this period is denoted as "second block" and the signal level corresponding to the second block is denoted as "second block level." It should also be noted that, in the following explanations, the block level calculated by the signal level calculator 131 is denoted as "first block level" and the block associated with the first block level is denoted as "first block." The second block level may also be subjected to the smoothing by an average value or a sum as in the case of the first block level. Also, i-th (where "i" is an integer not less than 0) second block is denoted as "$t_i$." Also, the frequency of the k-th (where "k" is an integer not less than 0) frequency signal is denoted as "$f_k$," and the second block level of the frequency signal of the frequency $f_k$ in the second block $t_i$ is denoted as "$p_{ki}$."

Figure 14:
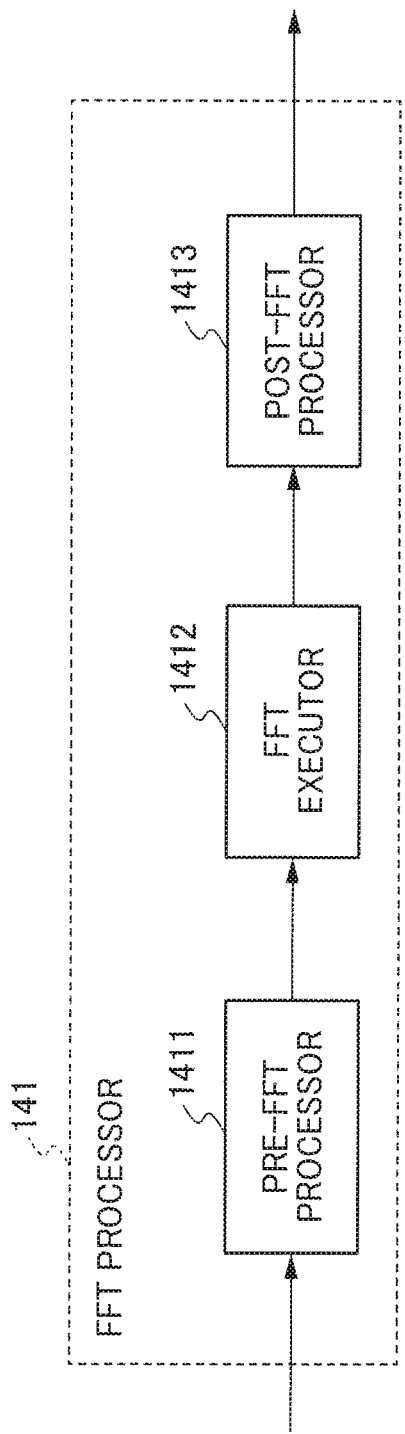
FIG. 14 is a block diagram illustrating an example of a schematic configuration of an FFT processor in accordance with the third embodiment.

FIG. 14 is a block diagram that illustrates an example of the schematic configuration of the FFT processor 141 in accordance with the third embodiment. The FFT processor 141 includes a pre-FFT processor 1411, an FFT executor 1412, and a post-FFT processor 1413. The pre-FFT processor 1411 is configured to perform FFT pre-processing such as buffer processing and window function processing. The FFT executor 1412 is configured to perform FFT for the digital complex signal that has been subjected to the pre-processing. The post-FFT processor 1413 is configured to perform FFT post-processing such as power conversion, low-pass processing, calculation of an average value or the like, and calculate the second block level.

The level threshold comparator 142 receives the second block level calculated by the FFT processor 141 and compares the second block level with the threshold that is applied to the second block level. In the following explanations, this threshold is denoted as "level threshold." The value of the level threshold may be defined as appropriate.

The total number calculator 143 calculates a total number of the second block levels that satisfy a predetermined condition (second condition) on the basis of the comparison result of the level threshold acquired from the level threshold comparator 142 and on the basis of the interference source signal reception period acquired from the signal detector 13. The predetermined condition requires, for example, that the frequency signal associated with the second block level should be received within the interference source signal reception period and that the second block level at issue should exceed the level threshold. In the following explanations, the total number at issue is denoted as "total number of threshold-exceeding block levels" (first total number). Meanwhile, the total number of threshold-exceeding block levels is calculated for each frequency of the frequency signal associated with the second block level. In the following explanations, the total number of threshold-exceeding block levels with the frequency $f_k$ is denoted as "$P_k$."

FIG. 15 is a diagram for explanation of the method of calculating the total number of threshold-exceeding block levels. In the example illustrated in FIG. 15, there are second blocks $t_1$ to $t_4$, and a case is considered where the second block levels have been calculated for three frequency signals whose frequencies are $f_{ka}$, $f_{kb}$, and $f_{kc}$, respectively. In this considered case, twelve (12) second blocks exist. The total number calculator 143 checks whether or not the twelve second block levels satisfy a predetermined condition. In the case of the above-described exemplary conditions, the total number calculator 143 checks whether or not the second blocks $t_1$ to $t_4$ reside within the interference source signal reception period. For example, if the second blocks $t_1$ to $t_3$ reside within the interference source signal reception period but the second block $t_4$ resides outside of the interference source signal reception period, then the frequency signals in the second blocks $t_1$ and $t_3$ are received in the interference source signal reception period. Accordingly, the total number calculator 143 checks the comparison result of the level threshold with regard to the nine (9) second block levels associated with the second blocks $t_1$, $t_2$, and $t_3$. This is because the second block level within the period in which the interference source signal was received should be taken into account for calculation of the occupied frequency band of the interference source signal.

For example, if the encircled $p_{ka1}$ and $p_{ka2}$ out of three second block levels $p_{ka1}$, $p_{ka2}$, and $p_{ka3}$ in the frequency $f_{ka}$ exceed the level threshold, the total number calculator 143 calculates the value of the total number $P_{ka}$ of threshold-exceeding block levels in frequency $f_{ka}$ as "2." The total number calculator 143 likewise calculates the total numbers $P_{kb}$ and $P_{kc}$ of threshold-exceeding block levels. In this manner, the total number calculator 143 calculates the total number of threshold-exceeding block levels for each frequency of the frequency signal associated with the second block level.

Also, the total number calculator 143 may perform operation based on the total number of threshold-exceeding block levels and calculate a computed value that is computed by the operation. For example, a value obtained by dividing the total number of threshold-exceeding block levels of the respective frequencies by a total number of the second block levels of the respective frequencies in the interference source signal reception period, in other words, a duty ratio, may be calculated. In the example of FIG. 15, the total number of the second block levels of $f_{ka}$ in the interference source signal reception period is three, i.e., $p_{ka1}$, $p_{ka2}$, and $p_{ka3}$, so that the duty ratio of the frequency $f_{ka}$ is $P_{ka}/3=2/3$. Also, for example, a ratio with respect to the largest total number of threshold-exceeding block levels among the total numbers of threshold-exceeding block levels of the respective frequencies may be calculated. Specifically, if the largest total number of threshold-exceeding block levels of the respective frequencies is given as $P_{max}$, then $P_{ka}/P_{max}$ may be calculated. In this manner, the total number of threshold-exceeding block levels may be normalized by a maximum value or the like of the total number of threshold-exceeding block levels.

Although, in the above explanation, the total number calculator 143 determines whether or not the second block resides within the interference source signal reception period, the level threshold comparator 142 may acquire the interference source signal reception period from the signal detector 13 and determine whether or not the second block resides within the interference source signal reception period. After that, it may be determined not to perform the comparison with regard to the second block out of the interference source signal reception period.

Figure 16:
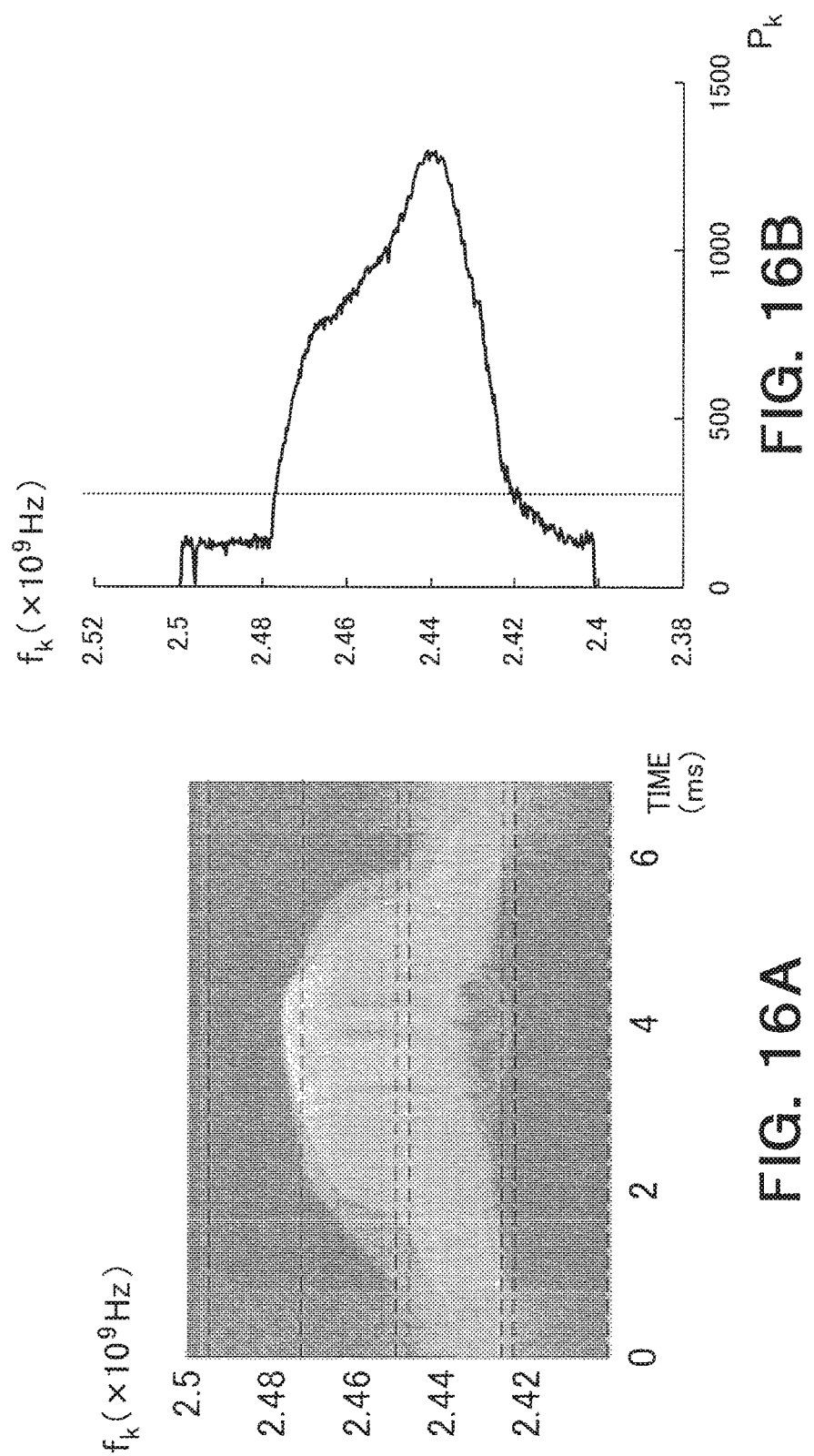
FIGS. 16A and 16B are diagrams for explanation of output by a total number calculator in accordance with the third embodiment.

FIGS. 16A and 16B are diagrams for explanation of output by the total number calculator 143 in accordance with the third embodiment. FIG. 16A is a diagram that illustrates an example of the signal level of the received radio signal. The signal level becomes higher as the color becomes closer to white. The white portion existing near the section extending from 2.42 to 2.48 of the vertical axis indicates the signal level regarding the interference source signal. FIG. 16B is an example of a graph that indicates the relationship between the frequency $f_k$ and the total number $P_k$ of threshold-exceeding block levels. The vertical axis represents the frequency $f_k$, and the horizontal axis indicates the total number $P_k$ of threshold-exceeding block levels. In response to the signal level of FIG. 16A, the value of the total number $P_k$ of threshold-exceeding block levels is indicated as a larger value in or near the section of the frequency of 2.42 to 2.48. It should be noted that a graph that indicates a duty ratio or the like will also appear as illustrated in FIG. 16B.

The occupied frequency band calculator 144 calculates the frequency band occupied by the interference source signal on the basis of the total number of threshold-exceeding block levels or the computed value of the total number of threshold-exceeding block levels. Specifically, the frequency band in which the total number of threshold-exceeding block levels or the computed value thereof exceeds a threshold related to the total number of threshold-exceeding block levels or the computed value is defined as the frequency band of the interference source signal. In the following explanations, this threshold is denoted as "total number threshold." It should be noted that the computed value of the total number of threshold-exceeding block levels may be calculated by the occupied frequency band calculator 144. The dotted line illustrated in FIG. 16B represents the total number threshold. The occupied frequency band calculator 144 defines the frequency band whose graph exists to the right side of the dotted line as the frequency band of the interference source signal.

Figure 17:
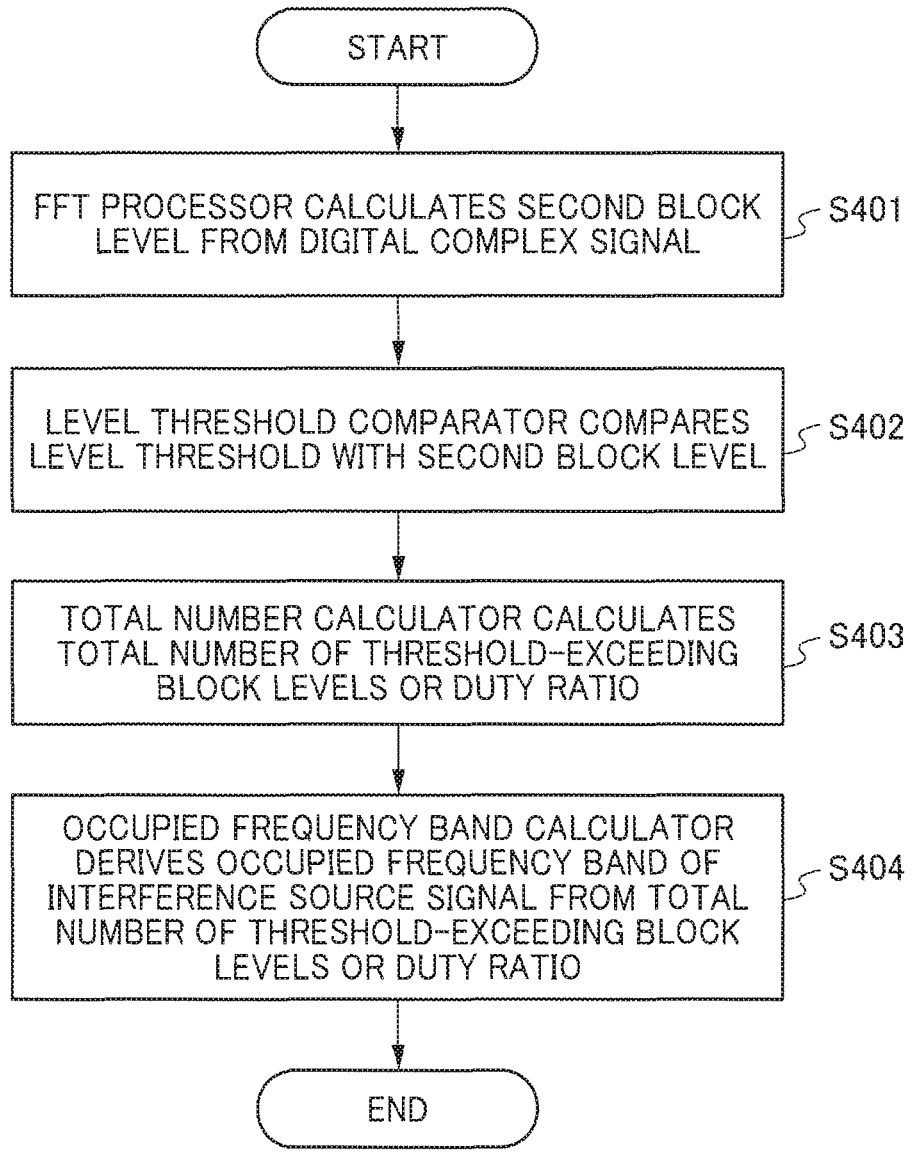
FIG. 17 is a diagram illustrating an example of a flowchart of schematic processing of an occupied frequency band deriver in accordance with the third embodiment.

FIG. 17 is a diagram that illustrates an example of a flowchart of schematic processing of the occupied frequency band deriver 14 in accordance with the third embodiment. The FFT processor 141 calculates the second block level from the digital complex signal (S401). The calculated the second block level is sent to the level threshold comparator 142, and the level threshold comparator 142 compares the second block level with the level threshold (S402). The comparison result of the level threshold is sent to the total number calculator 143.

The total number calculator 143 calculates the total number of threshold-exceeding block levels or a computed value thereof on the basis of the comparison result of the level threshold and the interference source signal reception period acquired from the signal detector 13 (S403). The detailed flow of the processing step S403 will be described later. The occupied frequency band calculator 144 compares the total number of threshold-exceeding block levels or the computed value thereof acquired from the total number calculator 143 with the total number threshold in order to calculate the range of frequency in which the total number of threshold-exceeding block levels or the computed value thereof exceeds the total number threshold, and defines this range as the occupied frequency band of the interference source signal (S404). This is the schematic processing flow of the occupied frequency band deriver 14.

Figure 18:
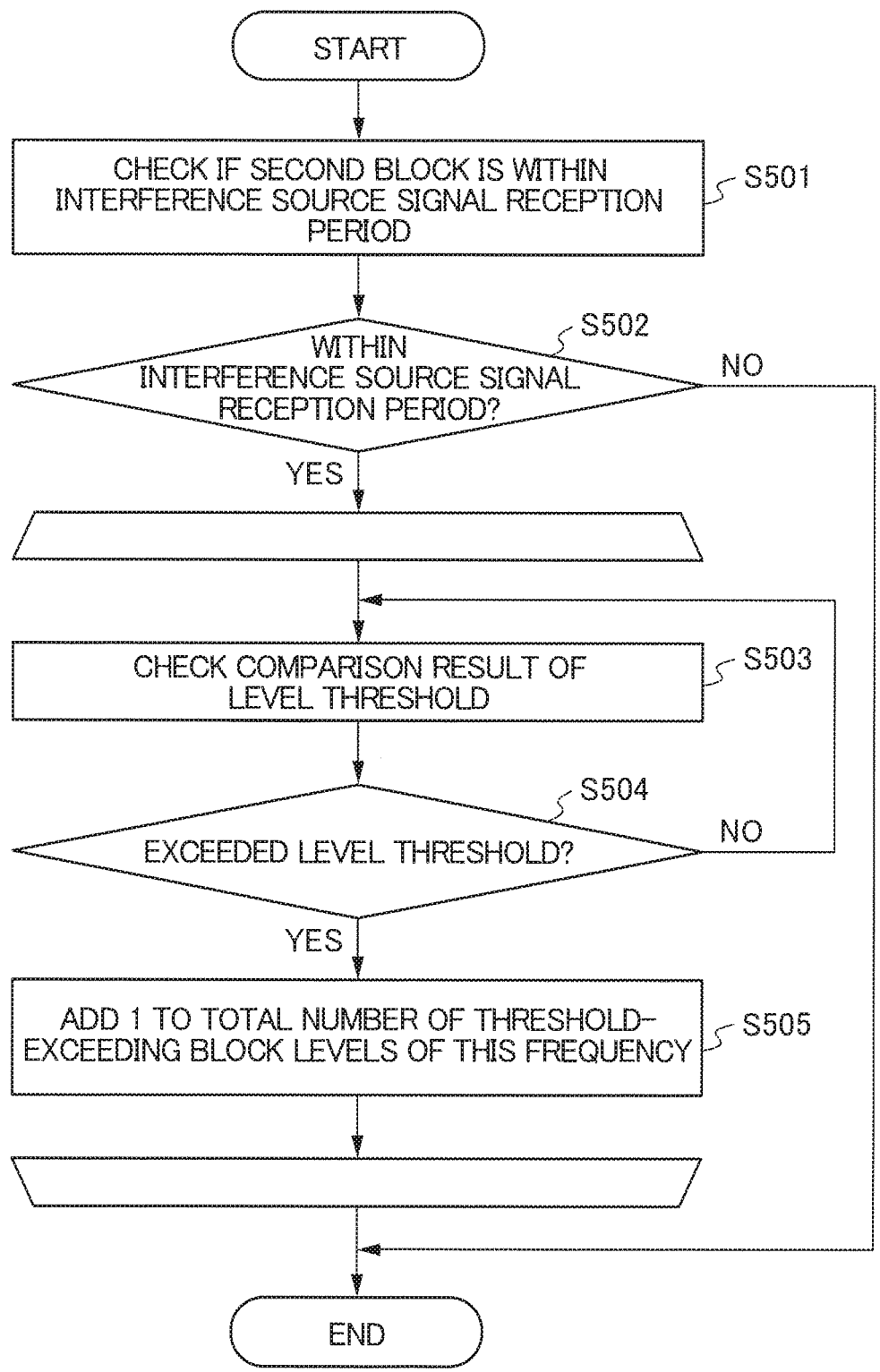
FIG. 18 is a diagram illustrating an example of a flowchart of schematic processing of a total number calculator in accordance with the third embodiment.

FIG. 18 is a diagram that illustrates an example of a flowchart of schematic processing of the total number calculator 143 in accordance with the third embodiment. This flow is carried out for each second block and repeated until all the second blocks are subjected to the processing. The total number calculator 143 checks whether or not the second block resides within the interference source signal reception period (S501). If the second block does not reside within the interference source signal reception period (NO in S502), the flow is terminated to proceed to the processing associated with the next second block. If it resides within the interference source signal reception period (YES in S502), the comparison result of the level threshold applied to the second block level is checked for each frequency of the frequency signal in the second block (S503).

For example, when the comparison result indicates that the second block level $p_{kai}$ of the frequency $f_{ka}$ does not exceed the level threshold (NO in S504), the second block level $p_{kbi}$ of the next frequency $f_{kb}$ is checked. When the comparison result indicates that the level threshold is exceeded (YES in S504), then one (1) is added to the total number of threshold-exceeding block levels $P_{ka}$ of the frequency $f_{ka}$ at this time point (S505). The total number of threshold-exceeding block levels of the respective frequencies can be calculated by carrying out this process for the respective frequencies. It should be noted that a computed value of the total number of threshold-exceeding block levels of the respective frequencies may be calculated after this process on the basis of the total number of threshold-exceeding block levels of the respective frequencies.

As has been described in the foregoing, according to this embodiment, the frequency band occupied by the interference source signal can be derived on the basis of the signal level of the frequency signal and the time period calculated by the signal detector 13 in which the interference source signal is received.

Fourth Embodiment

In this embodiment, a case is considered where the other signal is transmitted from the other wireless device 5 during the interference source signal transmission period. In the above considered case, according to the third embodiment, it may happen that the occupied frequency band of the other signal is included in the derived occupied frequency band of the interference source signal. In view of this, this embodiment ensures that the occupied frequency band of the other signal is not included therein.

Figure 19:
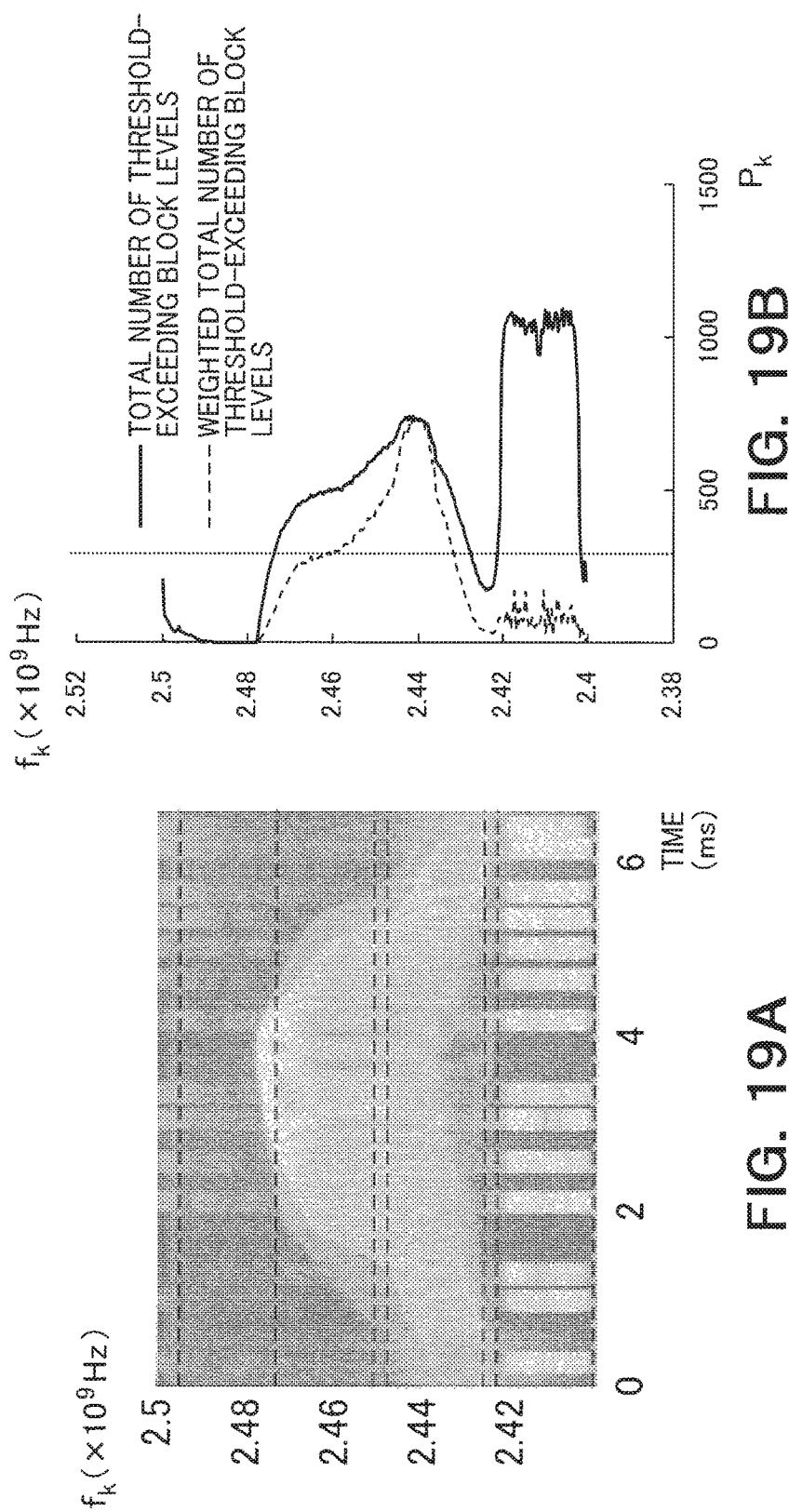
FIGS. 19A and 19B are diagrams for explanation of output of a total number calculator in accordance with a fourth embodiment.

FIGS. 19A and 19B are diagrams for explanation of output of the total number calculator 143 in accordance with a fourth embodiment. FIG. 19A is a diagram that illustrates an example of the signal level of the received radio signal. The white portion residing in or near the section from 2.42 to 2.48 of the vertical axis indicates the signal level of the interference source signal. Also, the white portion residing at the section at or below 2.42 of the vertical axis indicates the signal level of the other signal. It should be noted that the other signal of FIGS. 19A and 19B is a Wi-Fi™ signal and the communications are carried out by one channel of 2.401 to 2.423 GHz. The graph of the solid line in FIG. 19B is the graph of the total number $P_k$ of threshold-exceeding block levels calculated by the third embodiment. Since the total number of threshold-exceeding block levels exceeds the total number threshold even at and below the frequency 2.42 due to the other signal, the occupied frequency band of the other signal is included in the derived occupied frequency band of the interference source signal.

Meanwhile, the graph of the dotted line of FIG. 19B is a graph calculated by the fourth embodiment. The graph of the dotted line is a graph whose total number $P_k$ of threshold-exceeding block levels has been subjected to weighting. The coefficient associated with the weighting for the total number $P_k$ of threshold-exceeding block levels is denoted as "weight coefficient $A_k$." Also, the weighted total number of threshold-exceeding block levels is denoted as "weighted total number $P'_k$ of threshold-exceeding block levels." In the weighted total number $P'_k$ of threshold-exceeding block levels, the value of the portion associated with the occupied frequency band of the other signal is kept low. Accordingly, the occupied frequency band of the other signal is not included in the derived occupied frequency band of the interference source signal.

Figure 20:
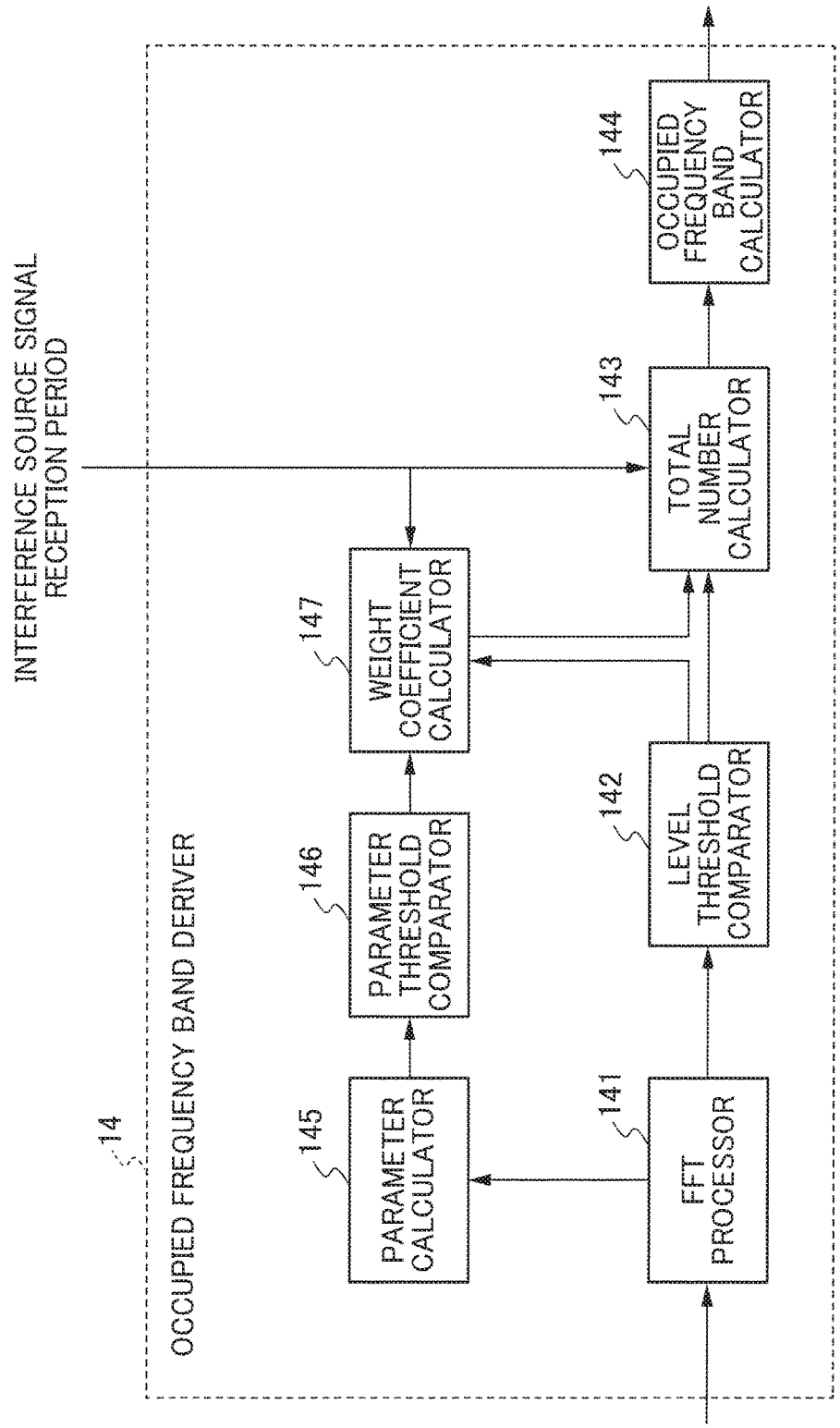
FIG. 20 is a block diagram illustrating an example of a schematic configuration of an occupied frequency band deriver in accordance with the fourth embodiment.

FIG. 20 is a block diagram that illustrates an example of the schematic configuration of the occupied frequency band deriver 14 in accordance with the fourth embodiment. The occupied frequency band deriver 14 of this embodiment further includes a parameter calculator 145, a parameter threshold comparator 146, and a weight coefficient calculator 147.

The parameter calculator 145 is configured to calculate a parameter for calculation of the weight coefficient on the basis of the second block level calculated by the FFT processor 141. The assumed parameter proposals are illustrated below.

(Parameter Proposal 1)

According to this proposal, the variation of the second block level (second variation) serves as the parameter. If the second block level is expressed as a log value, the variation of the second block level is defined as an absolute value of the difference between the second block levels of the same frequency in two adjacent second blocks. If the second block level is expressed as a true value, it is defined as the ratio between the second block levels. It should be noted that, when a ratio is to be calculated, the larger one or smaller one of the second block levels is assigned to the denominator rather than assigning the second block level of the later second block to the second block level to the denominator. In the following explanations, a case is considered where the second block level is expressed by a log value. The absolute value of the difference is denoted as "second block level difference value". The second block level difference value of the frequency signal with the frequency $f_k$ in the second block $t_i$ is denoted as "$d_{ki}$." In other words, the second block level difference value $d_{ki}$ is an absolute value of the difference between the second block level $p_{ki}$ in the second block $t_i$ and the second block level $p_{ki-1}$ in the second block $t_{i-1}$. The value $d_{ki}$ is expressed as "$d_{ki}=|p_{ki}-p_{k-1}|$." It should be noted that the initial value $d_{k1}$ (i=1) of the second block level difference value may be defined as any appropriate value such as zero (0).

While the second block level regarding the interference source signal changes sharply due to the switching, the second block level associated with the other signal by a wireless communication device that is compliant with the wireless LAN or other standard does not change very sharply. Accordingly, the second block level difference value of the occupied frequency band of the interference source signal is expected to be large while the second block level difference value of the occupied frequency band of the other signal is expected to be small. Hence, the weighted total number of threshold-exceeding block levels will take a value on which the influence of the other signal is suppressed by calculating the weight coefficient on the basis of the second block level difference value.

(Parameter Proposal 2)

According to this proposal, a computed value serves as the parameter, the computed value being computed based on the second block level and the second block level difference value associated with the second block level. This computed value is denoted as "second block level computed value". The second block level computed value of the frequency signal with the frequency $f_k$ in the second block $t_i$ is denoted as "$c_{ki}$." Any appropriate method may be defined to calculate the second block level computed value as long as it is calculated by addition, subtraction, multiplication, or division between the second block level and the second block level difference value, or by combination thereof. For example, it may be expressed as "$c_{ki}=p_{ki}\times d_{ki}$."

The parameter threshold comparator 146 compares the parameter calculated by the parameter calculator 145 with the threshold associated with the parameter. The threshold is denoted as "parameter threshold."

The parameter threshold may be defined as appropriate in accordance with the parameter.

The weight coefficient calculator 147 calculates the weight coefficient on the basis of the predetermined calculation method. The calculation method of the weight coefficient is illustrated below.

(Calculation Method 1)

According to this method, in the same manner as in the processing associated with the total number calculator 143, the weight coefficient calculator 147 calculates a total number (second total number) of parameters satisfying the predetermined condition (third condition) for each frequency of the frequency signal associated with the parameter. The weight coefficient calculator 147 calculates the total numbers on the basis of the comparison result of the parameter threshold acquired from the parameter threshold comparator 146 and the interference source signal reception period acquired from the signal determiner 134. The total numbers calculated for the respective frequencies are defined as the weight coefficients for the respective frequencies. An example of the predetermined condition requires both that the frequency signal associated with the parameter be received within the interference source signal reception period and that this parameter exceeds the parameter threshold. Also, the computed value associated with the total number such as the duty ratio and the normalized value may be defined as the weight coefficient.

FIG. 21 is a diagram for explanation of the calculation method of the weight coefficient. Referring to FIG. 21, the second block level, the second block level difference values, and the second block level computed values are illustrated, they being associated with the respective second blocks $t_1$ to $t_4$ with the frequency $f_k$. It is assumed here that the second blocks $t_1$ to $t_3$ reside within the interference source signal reception period. Also, a circle in FIG. 21 indicates that the encircled value exceeds the level threshold or the parameter threshold.

If the second block level difference value serves as the parameter, the total number of the second block level difference values exceeding the parameter threshold is 2, so that the weight coefficient $A_k$ with the frequency $f_k$ in accordance with the calculation method 1 will be 2. Also, if the duty ratio is used as the computed value, the weight coefficient $A_k$ will be 2/3. If the parameter is the second block level computed value, the total number of the second block level computed values exceeding the parameter threshold is 1, so that the weight coefficient $A_k$ with the frequency $f_k$ in accordance with the calculation method 1 will be 1. Also, if the duty ratio is used as the computed value, the weight coefficient $A_k$ will be 1/3.

(Calculation Method 2)

According to this method, the weight coefficient calculator 147 further acquires the comparison result of the level threshold from the level threshold comparator 142 in order to calculate the weight coefficient on the basis of the comparison result of the level threshold, the comparison result of the parameter threshold, and the interference source signal reception period. The comparison result of the parameter threshold and the comparison result of the level threshold are expressed as a logical value. If the threshold is exceeded, the comparison result is indicated as "1." If the threshold is not exceeded, the comparison result is indicated as "0."

The weight coefficient calculator 147 performs logical operation for each of the frequency signals received within the interference source signal reception period, using the comparison result of the second block level generated based on the frequency signal and the comparison results of the parameter. The logical operation may be defined as appropriate such as AND, OR, and XOR. In addition, the weight coefficient calculator 147 calculates the weight coefficients for the respective frequencies on the basis of the result of the logical operation of the frequency signals having the same frequency. For example, a total number of the logical operation results indicating "1" is calculated from among all the logical operation results of the frequency signals having the same frequency $f_k$. The total number associated with the calculated frequency $f_k$ will become the weight coefficient $A_k$ of the frequency $f_k$. It should be noted that the sum of the logical operation results of the frequency signals having the same frequency may be calculated. Also, a computed value such as the duty ratio of the total number and a normalized value may be defined as the weight coefficient.

For example, referring to FIG. 21, it is assumed that a value in the encircled portion exceeds the level threshold or the parameter threshold and that the value of the comparison result in the encircled portion is 1. It is also assumed here that the logical operation of the calculation method 2 is logical multiplication. If the second block level difference value is the parameter, "$p_{k1} \cdot d_{k1}$" is 1 while "$p_{k2} \cdot d_{k2}$" and "$p_{k3} \leq d_{k3}$" will be 0. Accordingly, among all the logical operation results of the frequency signals having the same frequency $f_{k1}$, the total number of the logical operation results indicating "1" will be 1. Accordingly, the weight coefficient $A_k$ with the frequency $f_k$ in accordance with the calculation method 2 is 1. If the duty ratio is used as the computed value, it will be 1/3. Likewise, if the second block level computed value is the parameter, "$p_{k1} \cdot c_{k1}$" is 1 while "$p_{k2} \cdot c_{k2}$" and "$p_{k3} \cdot c_{k3}$" are 0, so that the weight coefficient $A_k$ with the frequency $f_k$ in accordance with the calculation method 2 is also 1. If the duty ratio is used as the computed value, it will be 1/3.

Also, the weight coefficients for the respective frequencies may be calculated and the weight coefficients of the respective frequencies may be normalized by the value of the largest weight coefficient or the like.

Although the weight coefficient calculator 147 acquires the comparison result of the level threshold from the level threshold comparator 142 in the above explanations, the comparison result may be acquired from the parameter threshold comparator 146. In this case, the parameter threshold comparator 146 acquires the second block level from the parameter calculator 145 or the like in order to compares the second block level with the level threshold. Thus, the parameter threshold comparator 146 calculates the comparison result.

The total number calculator 143 in the same manner as in the third embodiment calculates the total number of threshold-exceeding block levels of the respective frequencies, and multiplies the total number of threshold-exceeding block levels of the respective frequencies by the weight coefficient of the respective frequencies obtained by the weight coefficient calculator 147 for the same frequency. By virtue of this, the weighted total numbers of threshold-exceeding block levels of the respective frequencies is calculated.

Figure 22:
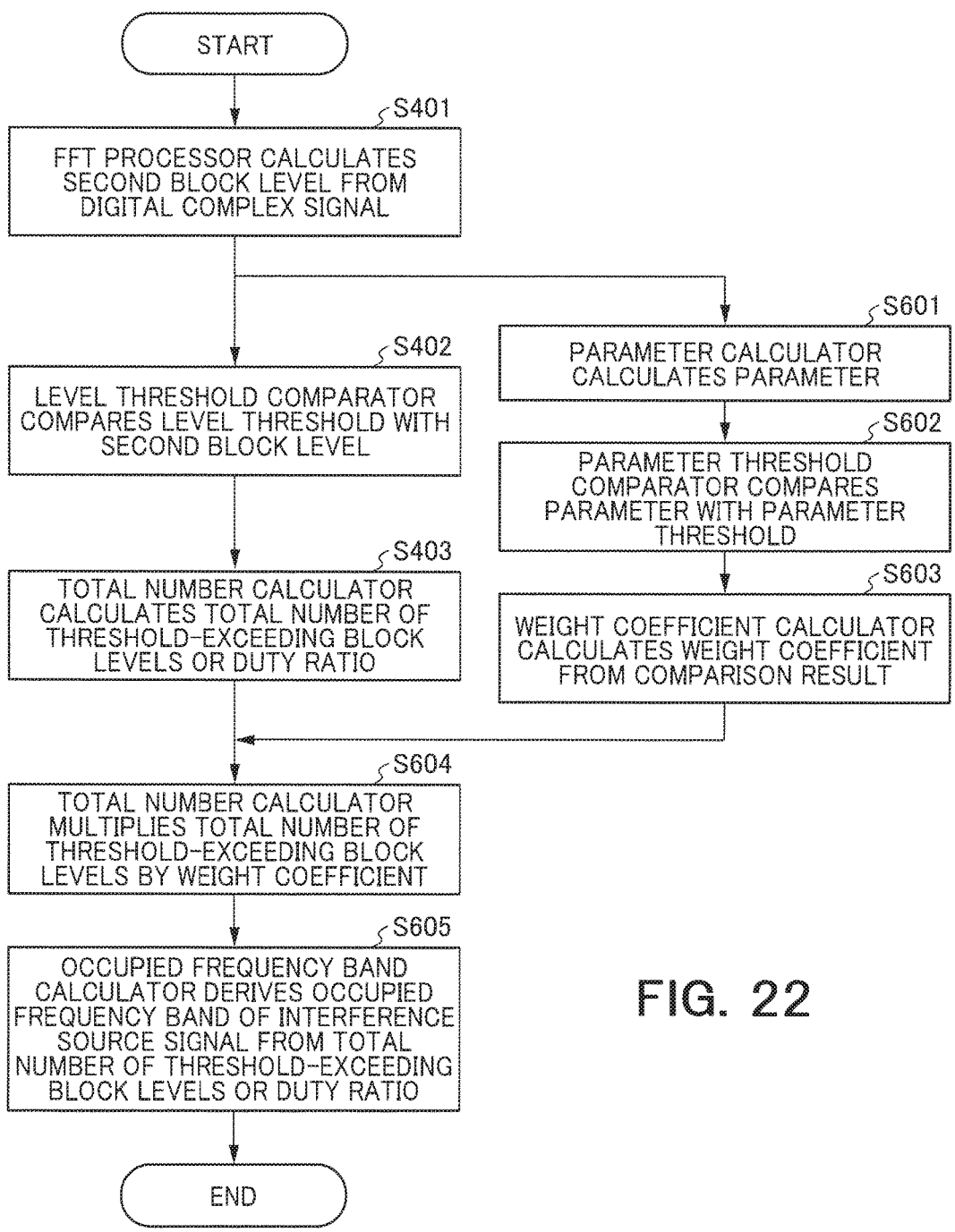
FIG. 22 is a diagram illustrating an example of a flowchart of schematic processing of an occupied frequency band deriver in accordance with the fourth embodiment.

FIG. 22 is a diagram that illustrates an example of a flowchart of schematic processing of the occupied frequency band deriver 14 in accordance with the fourth embodiment. The processing steps S401 to S403 are the same as or similar to those in the third embodiment. Meanwhile, according to this embodiment, after the processing step S401, the processing steps S601 to S603 are performed in parallel with the processing steps S402 and S403.

The parameter calculator 145 calculates the specified parameter on the basis of the second block level calculated by the FFT processor 141 (S601). The calculated parameter is sent to the parameter threshold comparator 146, and the parameter threshold comparator 146 compares the parameter with the parameter threshold (S602). The comparison result of parameter threshold is sent to the weight coefficient calculator 147.

The weight coefficient calculator 147 calculates the weight coefficient of the respective frequencies on the basis of both the comparison result of the parameter threshold and the interference source signal reception period acquired from the signal detector 13 (S603). The detailed flow of the processing step S603 will be described later. The weight coefficient of the calculated respective frequencies is sent to the total number calculator 143. The total number calculator 143 multiplies, for each frequency, the total number of threshold-exceeding block levels or duty ratio of the respective frequencies calculated in the processing process S403 by the obtained weight coefficient of the respective frequencies (S604). The occupied frequency band calculator 144 compares the weighted total number of threshold-exceeding block levels or duty ratio of the respective frequencies acquired by the total number calculator 143 with the total number threshold, and derives the occupied frequency band (S605). This is the schematic processing flow of the occupied frequency band deriver 14.

Figure 23:
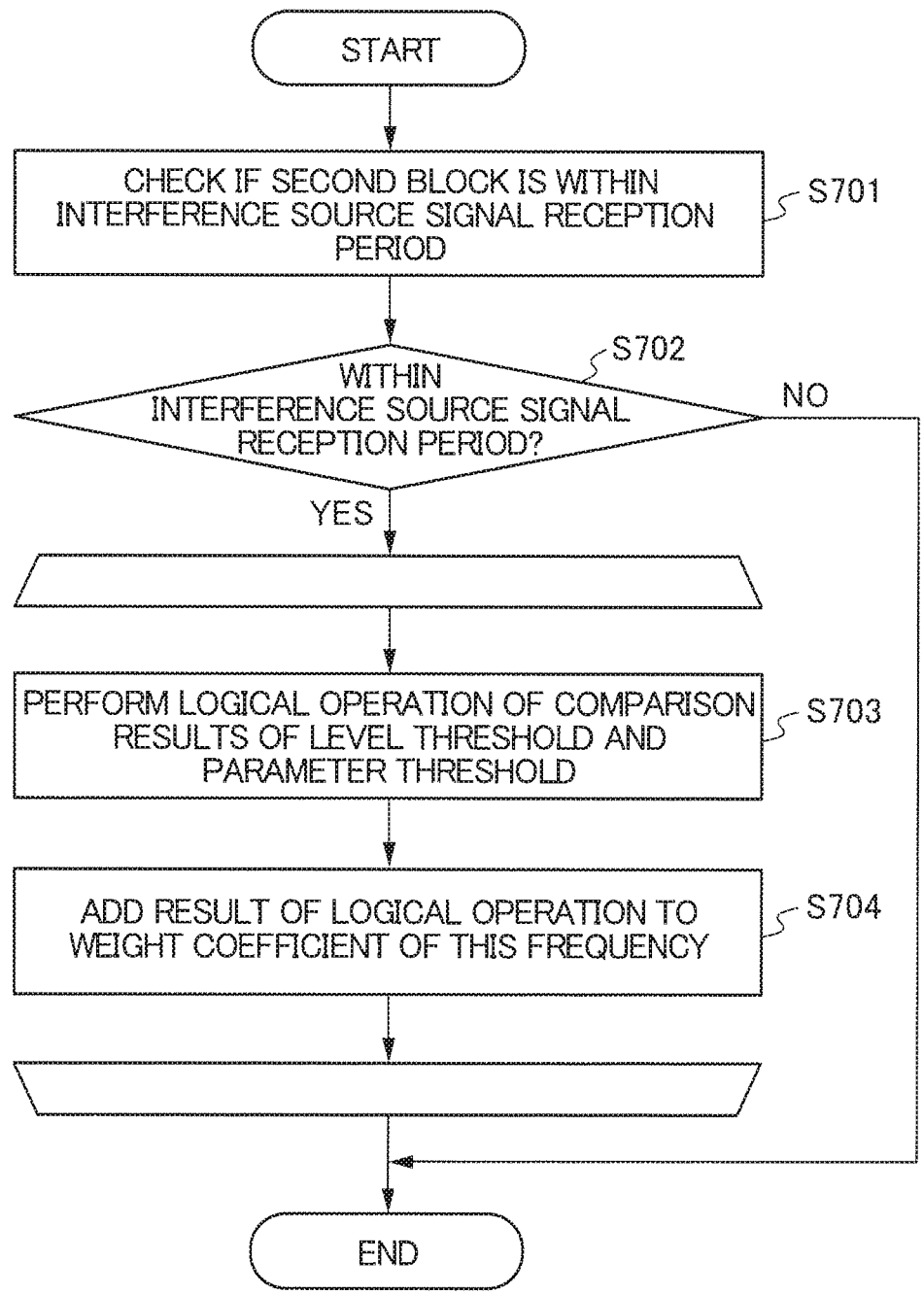
FIG. 23 is a diagram illustrating an example of a flowchart of schematic processing of a weight coefficient calculator in accordance with the fourth embodiment.

FIG. 23 is a diagram that illustrates an example of a flowchart of schematic processing of the weight coefficient calculator 147 in accordance with the fourth embodiment. This flow is a flow in the case where the weight coefficient is calculated by logical operation of the calculation method 2. This flow is performed for each comparison result of the level threshold or each comparison result of the parameter threshold. The flow is repeated until all the comparison results are processed.

The weight coefficient calculator 147 checks whether or not the second block associated with the comparison result resides within the interference source signal reception period (S701). If the second block does not reside in the interference source signal reception period (NO in S702), then the flow is terminated to proceed to the processing associated with the next comparison result. If the second block resides within the interference source signal reception period (YES in S702), the comparison result of the level threshold in the second block and the comparison result of the parameter threshold are subjected to the logical operation for each frequency (S703). The result of the logical operation is added to the weight coefficient at this time point of the frequency (S704). The processing steps S703 and S704 are performed for the respective frequencies, and thus the sum of logical operation results of the respective frequencies can be obtained, and the sum can be defined as the weight coefficient of the respective frequencies. It should be noted that, after the sum of logical operation results of the respective frequencies is calculated, the duty ratio may be calculated and defined as the weight coefficient.

As has been described in the foregoing, according to this embodiment, the second block level difference value or the second block level computed value is calculated as the parameter, the weight coefficient is calculated on the basis of the parameter, and the weighted total number of threshold-exceeding block levels based on the weight coefficient is calculated. In addition, when the occupied frequency band of the interference source signal is obtained on the basis of the weighted total number of threshold-exceeding block levels, it is made possible to ensure that the occupied frequency band of the other signal is not included regardless of the presence of the other signal.

Fifth Embodiment

It should be noted that the signal detection device 1 of the embodiments described in the foregoing may be implemented by a wireless communication terminal or the like that has the functionality of the signal detection device 1. For example, when a wireless communication terminal in which the signal detection device 1 is integrated detects the interference source signal, the wireless communications may be stopped for a fixed-length time. Also, the cycle of the interference source signal may be calculated by the interference source signal reception period and, on the basis of the calculated cycle, the timing of the wireless communication may be controlled. By virtue of this, it is made possible to avoid occurrence of a situation where the radio signal transmitted from the wireless communication terminal is interfered by the interference source signal.

It should be noted that the wireless communication terminal may be called a terminal, a wireless terminal, or a station (STA). Also, since the access point which is a base station of the wireless communication terminal also has the functionality of the terminal, the access point is one mode of the "terminal," although the access point also has the relay function. Accordingly, unless otherwise stated in the following explanations, the term "terminal" includes an access point as well. The terminal performs wireless communications in accordance with any appropriate wireless communications scheme. By way of example, the terminals perform communications compliant with the IEEE 802.11 standard. It should be noted that the wireless communication system considered in this embodiment is, but not limited to, a wireless LAN system that is compliant with the IEEE 802.11 standard.

Figure 24:
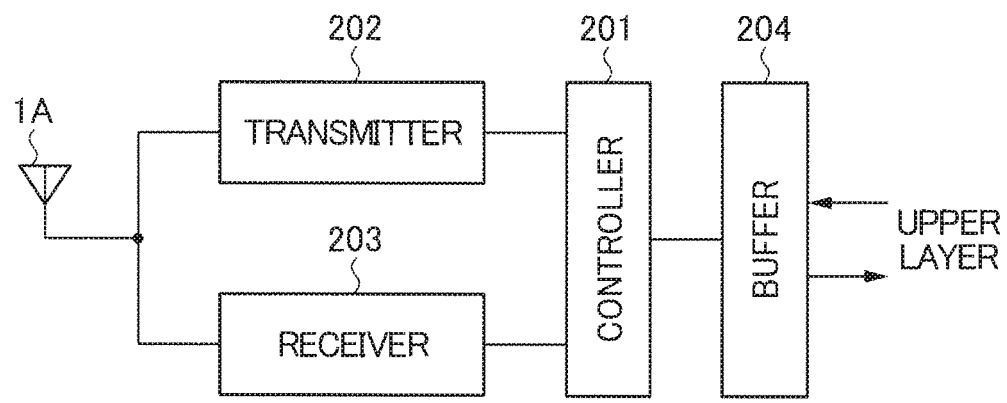
FIG. 24 is a functional block diagram of a wireless communication device incorporated in a terminal.

FIG. 24 is a functional block diagram of a wireless communication device incorporated in the terminal. The wireless communication device 2 includes at least one antenna 1A, a controller 201, a transmitter 202, a receiver 203, and a buffer 204.

The controller 201 corresponds to a device that controls the communications or a baseband integrated circuit. The transmitter 202 and the receiver 203 correspond to devices that transmit and receive frames or RF integrated circuits. The processing of the controller 201 and all or part of the processing associated with the digital regions of the transmitter 202 and the receiver 203 may be carried out by software (software programs) that runs on a processor such as a CPU. Alternatively, these processing may be carried out by hardware or by both of the software and the hardware. The terminal may include a processor configured to perform all or part of the processing associated with the controller 201, the transmitter 202, and the receiver 203.

The buffer 204 is a storage for exchanging frames, data, or the like between an upper layer and the controller 201. The buffer 204 may be volatile memory such as DRAM or non-volatile memory such as NAND, MRAM, etc. The upper layer may generate a frame to be transmitted to other devices on the network such as other terminals and a server. The upper layer may generate stores the generated frame in the buffer 204. The upper layer receives a frame or its payload received from the other terminal or device or the like from the controller 201 via the buffer 204. The upper layer may perform communication processing of the upper layer above the MAC layer such as TCP/IP and UDP/IP. Also, TCP/IP and UDP/IP may be processed by the controller 201 and the upper layer may perform processing of the application layer above them. The operation of the upper layer may be carried out by software (software programs) that runs on a processor such as a CPU or carried out by hardware or both of the software and the hardware.

The controller 201 mainly performs processing of the MAC layer. The controller 201 transmits and receives frames to and from other terminals via the transmitter 202 and the receiver 203 and thereby controls communications with the other terminal. Also, the controller 201 may include a clock generator that generates a clock signal and manage the internal time using the clock signal generated by the clock generator. The controller 201 may output the clock signal created by the clock generator to an external device. Alternatively, the controller 201 may receive input of the clock signal generated by an external clock generator and manage the internal time using the clock signal.

The controller 201 by way of example receives a beacon frame and recognizes the attributes of the basic service set (BSS) of the other terminal and synchronization information. Then, the controller 201 sends an association request to the other terminal to perform the association process. By virtue of this, the controller 201 exchanges necessary information regarding the capabilities and attributes of the both parties and thus establishes the wireless link with the other terminal. The information may include capability information regarding whether or not they support DL-MU-MIMO. The controller 201 may perform an authentication process in advance with an access point as required.

The controller 201 periodically checks the buffer 204 and recognizes the status of the buffer 204 such as presence of data to be transmitted by uplink transmission. Alternatively, the controller 201 checks the status of the buffer 204 in response to a trigger sent from the outside of the buffer 204 or the like. When the controller 201 confirms the presence of the data to be transmitted to the other terminal, then the controller 201 may acquire the access right (transmission right) to access a wireless medium on the basis of CSMA/CA, etc., and then transmit a frame including the data (more specifically, a physical packet to which a physical header is added) via the transmitter 202 and the antenna 1A. It should be noted that acquisition of the access right may be performed by transmitting an RTS frame to the access point and receiving a CTS frame.

The radio processor 12, the signal detector 13, and the occupied frequency band deriver 14 of the signal detection device 1 may be configured by the controller 201 or may be configured by the upper layer. When they are configured by the controller 201, the controller 201 generates a digital complex signal from the radio signal received from the receiver 203, then calculates the block level from the digital complex signal, then calculates the variation of the block level, then calculates the statistic of the variation, and then detects the interference source signal from the interference source 4 in the statistic definition interval on the basis of the statistic. Also, the controller 201 controls transmission of the radio signal of the transmitter 202. For example, when the controller 201 has detected the interference source signal, the controller 201 may stop the processing associated with the transmitter 202 until a fixed-length time elapses. Alternatively, the controller 201 may estimate the cycle of the interference source signal during the period in which the interference source signal has been detected, in other words, on the basis of the calculated interference source signal reception period, and then stop the processing associated with the transmitter 202 in the period during which the interference source signal is expected to be emitted.

The transmitter 202 performs digital-to-analog (DA) conversion, a filtering process to extract a desired band component, frequency conversion (up-conversion), and/or other relevant processes for the frame input from the controller 201. Then, the transmitter 202 amplifies the signal obtained by these processes with the pre-amplifier to emit it from one or more antenna into the air as a radio wave. It should be noted that, if a plurality of antennas are provided, the same signals may be simultaneously transmitted via the respective antennas. Alternatively, it is also possible to control the directivity of the transmission using the plurality of antennas.

The signal received by the antenna 1A is processed by the receiver 203. The received signal is amplified by a low noise amplifier (LNA) in the receiver 203 and performed the frequency conversion (down-conversion). After that, the desired band component is extracted from the down-converted signal by the filtering process. The extracted signal may further be converted into a digital signal by analog-to-digital (AD) conversion and may be output to the controller 201. Accordingly, the radio receiver 11 and the radio processor 12 of the signal detection device 1 may be configured by the receiver 203. The controller 201 performs demodulation, error correction decoding, and processing of the physical header. Thereby, a frame such as a data frame (including a frame received by DL-MU-MIMO) is obtained. When the receiver address of the MAC header of the frame agrees with the MAC address of the terminal itself, the frame is processed as a frame addressed to the terminal itself. When they do not agree with each other, the frame is discarded.

The controller 201 performs CRC check for the received frame. In the case of an aggregation frame, CRC check is performed for each of the individual data frames within the aggregation frame. The controller 201 transmits an acknowledgement frame via the transmitter 202 upon lapse of a fixed-length time such as a short interframe space (SIFS) after completion of reception of the frame.

When the controller 201 received the frame for channel estimation from the access point, the controller 201 calculates variation in the amplitude and the phase on the basis of a known signal identified in advance and the received signal in the predetermined field included in the channel estimation frame. In addition, the controller 201 generates a report frame that includes channel information indicative of the calculated variations in the amplitude and the phase in order to transmit the report frame to the access point.

When the controller 201 received a frame requesting measurement of quality of the channel from the access point, the controller 201 acquires the quality information of the channel by measurement and then transmits a frame including the quality information. For example, the controller 201 measures the quality of the channel using a known signal included in the physical header of the frame, and thereby acquires the quality information. As an example of the quality information, SNR (signal to nose ratio) and RSSI (received signal strength indicator) may be mentioned, but the quality information is not limited to them. Alternatively, the quality information may be included along with the channel information in the above-described report frame. Also, in the case where the access point transmits a frame recruiting terminals that have their intention to accept DL-MU-MIMO transmission by broadcast or multicast, when the terminals transmit, in response thereto, a frame that includes notification to the effect that they have their intention to accept it to the access point, the quality information may be included in the frame transmitted as the response.

Also, the controller 201 may spontaneously perform transmission of the frame including the quality information of the channel. Any appropriate methods other than those described herein may be relied upon to transmit the frame including the quality information of the channel.

When the controller 201 transmitted the frame such as a data frame to the other terminal, the controller 201 receives an acknowledgement frame transmitted from the other terminal via the receiver 203 upon lapse of a fixed-length time such as SIFS after completion of transmission. The controller 201 determines whether or not the transmission of the data frame (in the case of the aggregation frame, the individual data frames that are aggregated therein) has been successful.

The controller 201 may access a storage device to read information therefrom, the storage device storing either or both of information to be notified to other terminals and information notified from the other terminals. The storage device may be internal memory or external memory, and may be volatile memory or non-volatile memory. Also, the storage device may be an SSD, a hard disk, etc. as well as the memory.

The assignment of the above-described processes between the controller 201 and the transmitter 202 is merely an example and it is also possible to rely on other modes of assignment different than the above-described one. For example, the processes concerning the digital region and the DA conversion may be performed by the controller 201. The subsequent processes after the DA conversion may be performed by the transmitter 202. Likewise, with regard to the assignment of the processes between the controller 201 and the receiver 203, the processes up to the AD conversion (processes of the radio receiver 11) may be performed by the receiver 203 and the processes on the digital region including the processes including the AD conversion and those that follow may be performed by the controller 201.

By way of example, the baseband integrated circuit in accordance with this embodiment corresponds to a section that performs the processes concerning the digital region and the DA conversion at the time of the transmission and a section that performs the AD conversion and the processes that follow at the time of reception, and the RF integrated circuit corresponds to the section that performs the DA conversion and the processes that follow at the time of transmission and the section that performs the processes up to the AD conversion at the time of reception. The integrated circuit for wireless communications in accordance with this embodiment includes at least the baseband integrated circuit from the baseband integrated circuit and the RF integrated circuit. Any other appropriate methods may be relied upon to assign the processes between blocks or the processes between the baseband integrated circuit and the RF integrated circuit.

Sixth Embodiment

Figure 25:
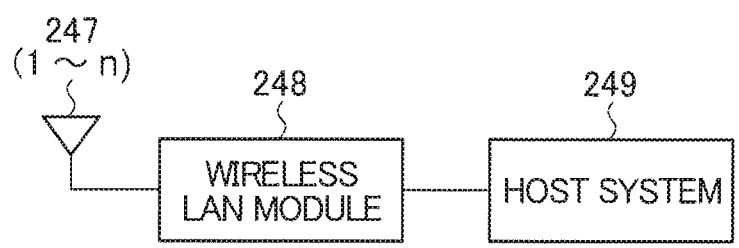
FIG. 25 is a diagram illustrating an example of entire configuration of a terminal.

FIG. 25 illustrates an example of entire configuration of a terminal. The example of configuration is just an example, and the present embodiment is not limited to this. The terminal includes one or a plurality of antennas 247 (1 to n, where n is an integer not less than 1), a wireless LAN module 248, and a host system 249. The wireless LAN module 248 corresponds to the wireless communication device according to the fifth embodiment. The wireless LAN module 248 includes a host interface and is connected to the host system 249 through the host interface. Other than the connection to the host system 249 through the connection cable, the wireless LAN module 248 may be directly connected to the host system 249. The wireless LAN module 248 can be mounted on a substrate by soldering or the like and can be connected to the host system 249 through wiring of the substrate. The host system 249 uses the wireless LAN module 248 and the antennas 247 (1 to n) to communicate with external devices according to an arbitrary communication protocol. The communication protocol may include the TCP/IP and a protocol of a layer higher than that. Alternatively, the TCP/IP may be mounted on the wireless LAN module 248, and the host system 249 may execute only a protocol in a layer higher than that. In this case, the configuration of the host system 249 can be simplified. Examples of the present terminal include a mobile terminal, a TV, a digital camera, a wearable device, a tablet, a smartphone, a game device, a network storage device, a monitor, a digital audio player, a Web camera, a video camera, a projector, a navigation system, an external adaptor, an internal adaptor, a set top box, a gateway, a printer server, a mobile access point, a router, an enterprise/service provider access point, a portable device, a hand-held device, and so on.

Figure 26:
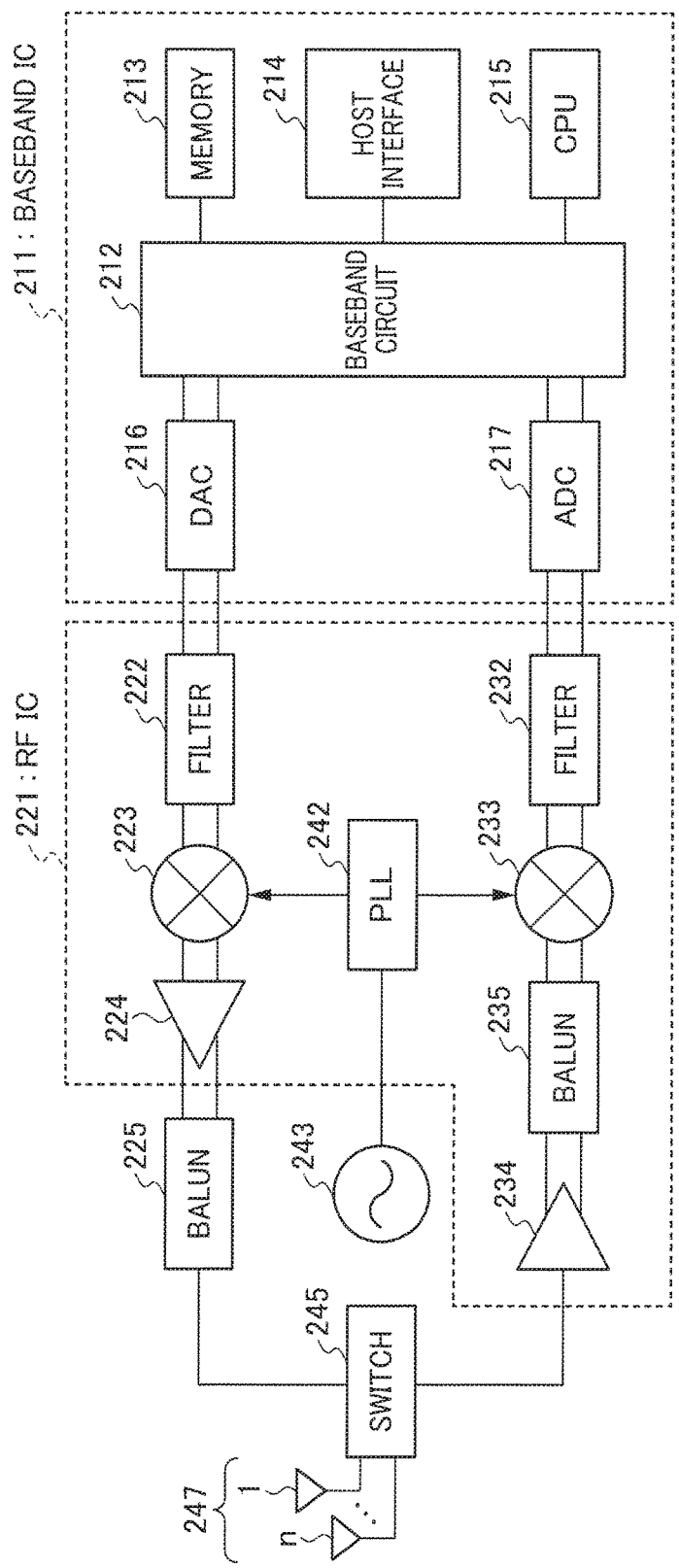
FIG. 26 is a diagram illustrating an example of hardware configuration of a wireless LAN module.

FIG. 26 illustrates an example of hardware configuration of a wireless LAN module. The configuration can also be applied when the wireless communication device is mounted on either one of the terminal that is a non-access point terminal and the access point. Therefore, the configuration can be applied as an example of specific configuration of the wireless communication device shown in FIG. 24. It should be noted that the signal processing device can also be implemented by this configuration. At least one antenna 247 is included in the example of configuration; however, two or more antennas may be included. When a plurality of antennas are included, a plurality of sets of a transmission system (216 and 222 to 225), a reception system (232 to 235), a PLL 242, a crystal oscillator (reference signal source) 243, and a switch 245 may be arranged according to the antennas, and each set may be connected to a baseband circuit 212. One or both of the PLL 242 and the crystal oscillator 243 correspond to an oscillator according to the present embodiment.

The wireless LAN module (wireless communication device) includes a baseband IC (Integrated Circuit) 211, an RF (Radio Frequency) IC 221, a balun 225, the switch 245, and the antenna 247.

The baseband IC 211 includes a baseband circuit 212, a memory 213, a host interface 214, a CPU 215, a DAC (Digital to Analog Converter) 216, and an ADC (Analog to Digital Converter) 217. The baseband IC 211 is configured to perform processing of the controller 201 of the wireless communication device illustrated in FIG. 24.

The baseband IC 211 and the RF IC 221 may be formed on the same substrate. The baseband IC 211 and the RF IC 221 may be formed by one chip. Both or one of the DAC 216 and the ADC 217 may be arranged on the RF IC 221 or may be arranged on another IC. Both or one of the memory 213 and the CPU 215 may be arranged on an IC other than the baseband IC.

The memory 213 is configured to store data for use in the processing associated with the baseband (e.g., block level) and data exchanged with the host system. The memory 213 also stores one or both of information to be transmitted to the terminal or the base station and information transmitted from the terminal or the base station. The memory 213 may also store a program necessary for the execution of the CPU 215 and may be used as a work area for the CPU 215 to execute the program. The memory 213 may be a volatile memory, such as an SRAM or a DRAM, or may be a non-volatile memory, such as a NAND or an MRAM.

The host interface 214 is an interface for connection to the host system. The interface can be anything, such as UART, SPI, SDIO, USB, or PCI Express™, and the like.

The CPU 215 is a processor that executes a program to control the baseband circuit 212. The baseband circuit 212 mainly executes a process of the MAC layer and a process of the physical layer. Accordingly, either or both of the baseband circuit 212 and the CPU 215 correspond to the controller 201 of the wireless communication device. Also, the signal detector 13 and the occupied frequency band deriver 14 of the signal detection device 1 are configured by either or both of them.

At least one of the baseband circuit 212 or the CPU 215 may include a clock generator that generates a clock signal and may manage internal time by the clock generated by the clock generator.

For the process of the physical layer, the baseband circuit 212 performs addition of the physical header, coding, encryption, modulation process, and the like of the frame to be transmitted and generates, for example, two types of digital baseband signals (hereinafter, "digital I signal" and "digital Q signal"). Accordingly, the radio processor 12 of the signal detection device 1 is configured by the baseband circuit 212.

The DAC 216 is configured to perform DA conversion of signals input from the baseband circuit 212. More specifically, the DAC 216 converts the digital I signal to an analog I signal and converts the digital Q signal to an analog Q signal. Note that a single system signal may be transmitted without performing quadrature modulation. When a plurality of antennas are included, and single system or multi-system transmission signals equivalent to the number of antennas are to be distributed and transmitted, the number of provided DACs and the like may correspond to the number of antennas.

The RF IC (wireless communication circuit) 211 is configured to perform processing associated with the transmitter 202 and the receiver 203 of the wireless communication device illustrated in FIG. 24. The RF IC 221 is, by way of example, an RF analog IC or a high-frequency IC, or both of them. The RF IC 221 includes a filter 222, a mixer 223, a pre-amplifier (PA) 224, a PLL (phase locked loop) circuit 242, an LNA, a balun 235, a mixer 233, and a filter 232. Some of these components may be arranged on the baseband IC 211 or another IC. The filters 222, 232 may be a bandpass filter or a lowpass filter.

The RF IC 221 is, for example, one or both of an RF analog IC and a high frequency IC. The RF IC 221 includes a filter 222, a mixer 223, a preamplifier (PA) 224, the PLL (Phase Locked Loop) 242, a low noise amplifier (LNA) 234, a balun 235, a mixer 233, and a filter 232. Some of the elements may be arranged on the baseband IC 211 or another IC. The filters 222 and 232 may be bandpass filters or low pass filters.

The filter 222 extracts a signal of a desired band from each of the analog I signal and the analog Q signal input from the DAC 216. The PLL 242 uses an oscillation signal input from the crystal oscillator 243 and performs one or both of division and multiplication of the oscillation signal to thereby generate a signal at a certain frequency synchronized with the phase of the input signal. Note that the PLL 242 includes a VCO (Voltage Controlled Oscillator) and uses the VCO to perform feedback control based on the oscillation signal input from the crystal oscillator 243 to thereby obtain the signal at the certain frequency. The generated signal at the certain frequency is input to the mixer 223 and the mixer 233. The PLL 242 is equivalent to an example of an oscillator that generates a signal at a certain frequency.

The mixer 223 uses the signal at the certain frequency supplied from the PLL 242 to up-convert the analog I signal and the analog Q signal passed through the filter 222 into a radio frequency. The preamplifier (PA) amplifies the analog I signal and the analog Q signal at the radio frequency generated by the mixer 223, up to desired output power. The balun 225 is a converter for converting a balanced signal (differential signal) to an unbalanced signal (single-ended signal). Although the balanced signal is handled by the RF IC 221, the unbalanced signal is handled from the output of the RF IC 221 to the antenna 247. Therefore, the balun 225 performs the signal conversions.

The switch 245 is connected to the balun 225 on the transmission side during the transmission and is connected to the balun 234 or the RF IC 221 on the reception side during the reception. The baseband IC 211 or the RF IC 221 may control the switch 245. There may be another circuit that controls the switch 245, and the circuit may control the switch 245.

The analog I signal and the analog Q signal at the radio frequency amplified by the preamplifier 224 are subjected to balanced-unbalanced conversion by the balun 225 and are then emitted as radio waves to the space from the antenna 247.

The antenna 247 may be a chip antenna, may be an antenna formed by wiring on a printed circuit board, or may be an antenna formed by using a linear conductive element.

The LNA 234 in the RF IC 221 amplifies a signal received from the antenna 247 through the switch 245 up to a level that allows demodulation, while maintaining the noise low. The balun 235 performs unbalanced-balanced conversion of the signal amplified by the low noise amplifier (LNA) 234. The mixer 233 uses the signal at the certain frequency input from the PLL 242 to down-convert, to a baseband, the reception signal converted to a balanced signal by the balun 235. More specifically, the mixer 233 includes a generator that generates carrier waves shifted by a phase of 90 degrees based on the signal at the certain frequency input from the PLL 242. The mixer 233 uses the carrier waves shifted by a phase of 90 degrees to perform quadrature demodulation of the reception signal converted by the balun 235 and generates an I (In-phase) signal with the same phase as the reception signal and a Q (Quad-phase) signal with the phase delayed by 90 degrees. The filter 232 extracts signals with desired frequency components from the I signal and the Q signal. Gains of the I signal and the Q signal extracted by the filter 232 are adjusted, and the I signal and the Q signal are output from the RF IC 221.

The ADC 217 in the baseband IC 211 performs AD conversion of the input signal from the RF IC 221. More specifically, the ADC 217 converts the I signal to a digital I signal and converts the Q signal to a digital Q signal. Note that a single system signal may be received without performing quadrature demodulation.

When a plurality of antennas are provided, the number of provided ADCs may correspond to the number of antennas. Based on the digital I signal and the digital Q signal, the baseband circuit 212 executes a process of the physical layer and the like, such as demodulation process, error correcting code process, and process of physical header, and obtains a frame. The baseband circuit 212 applies a process of the MAC layer to the frame. Note that the baseband circuit 212 may be configured to execute a process of TCP/IP when the TCP/IP is implemented.

Seventh Embodiment

Figure 27A:
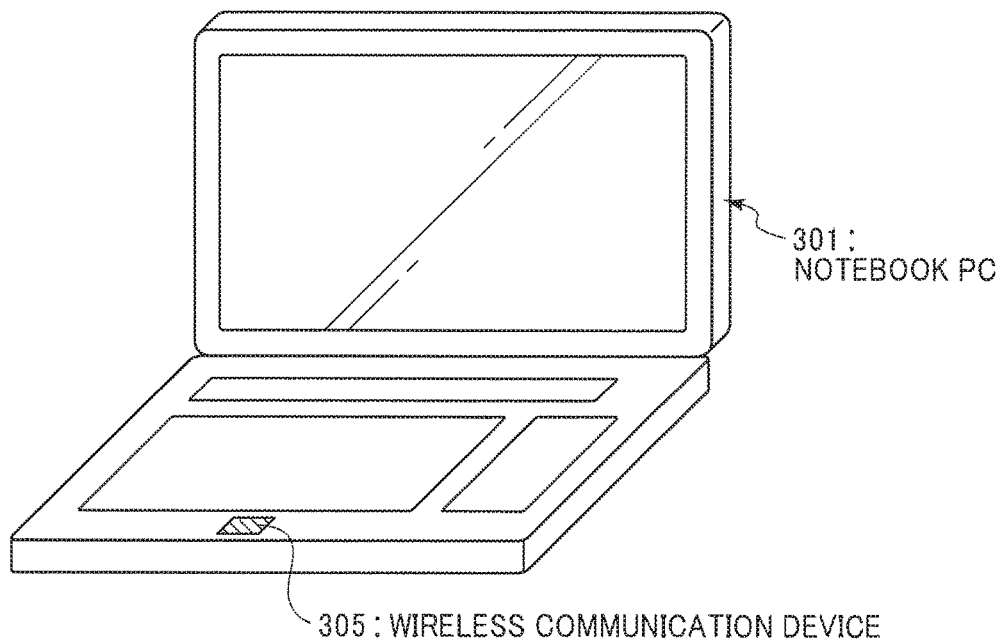
FIGS. 27A and 27B are perspective views of the terminal.
Figure 27B:
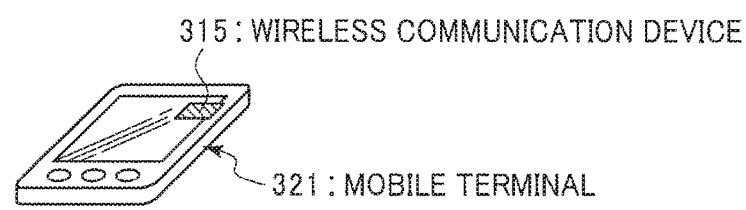

FIG. 27A and FIG. 27B are perspective views of the terminal in accordance with this embodiment. The wireless terminal of FIG. 16A is a notebook PC 301 and the wireless terminal of FIG. 16B is a mobile terminal 321. The notebook PC 301 and the mobile terminal 321 incorporate the wireless communication devices 305 and 315, respectively. The wireless communication device incorporated in the wireless terminal that has been described in the foregoing or the wireless communication device incorporated in the access point (base station), or both of them can be used as the wireless communication devices 305, 315. The wireless terminal that incorporates the wireless communication device is not limited to a notebook PC or a mobile terminal. A wireless terminal carrying a wireless communication device is not limited to notebook PCs and mobile terminals. For example, it can be installed in a TV, a digital camera, a wearable device, a tablet, a smart phone, a gaming device, a network storage device, a monitor, a digital audio player, a web camera, a video camera, a projector, a navigation system, an external adapter, an internal adapter, a set top box, a gateway, a printer server, a mobile access point, a router, an enterprise/service provider access point, a portable device, a handheld device, a vehicle and so on.

Figure 28:
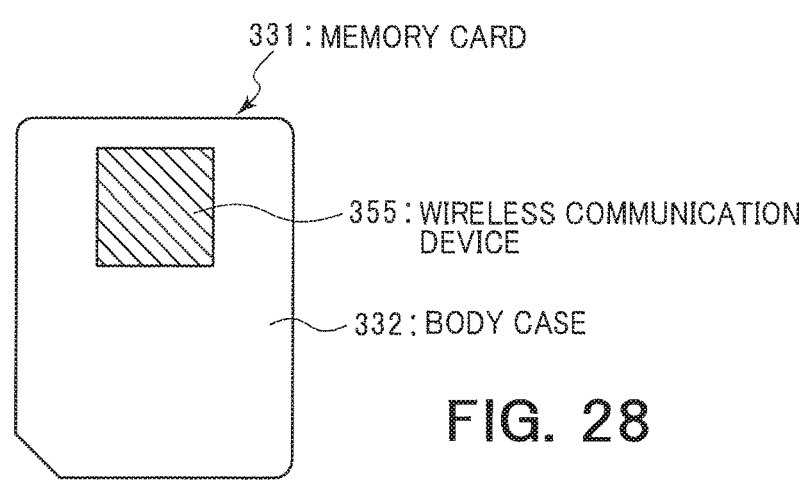
FIG. 28 is a diagram illustrating an example of a wireless communication device mounted on a memory card.

Moreover, the wireless communication device incorporated in either or both of wireless terminal and the access point can also be provided in a memory card. FIG. 28 illustrates an example of a wireless communication device mounted on a memory card. A memory card 331 contains a wireless communication device 355 and a body case 332. The memory card 331 uses the wireless communication device 335 for wireless communications with an external device (either or both of the wireless terminal and the access point, or the like). It should be noted that FIG. 28 does not explicitly illustrate the other components within the memory card 331 (e.g., memory, etc.).

Eighth Embodiment

According to this embodiment, in addition to the features of the wireless communication device (a wireless communication device of a base station, a wireless communication device of a wireless terminal, or both of them) in accordance with the above-described embodiment, a bus, a firmware processor, and an external interface are provided. The firmware processor and the external interface are connected with an external memory (a buffer) through the bus. A firmware operates the firmware processor. Thus, by adopting a configuration in which the firmware is included in the wireless communication device, the functions of the wireless communication device can be easily changed by rewriting the firmware. The firmware processor in which the firmware runs may be a controller in accordance with this embodiment, a processor that performs the processing associated with the controller, or another processor that performs processing associated with functional extension or modification of the processing. The firmware processor in which the firmware runs may be incorporated in a base station, a wireless terminal, or both of them in accordance with this embodiment. The firmware processor in which the firmware operates may be included in the bases station or the wireless terminal or both of them according to the present embodiment. Alternatively, the firmware processor may be included in the integrated circuit of the wireless communication device installed in the base station, or in the integrated circuit of the wireless communication device installed in the wireless terminal.

Ninth Embodiment

According to this embodiment, in addition to the features of the wireless communication device (a wireless communication device of a base station, a wireless communication device of a wireless terminal, or both of them) in accordance with the above-described embodiments, a clock generator is provided. The clock generator is configured to generate a clock signal and output the clock signal on the output terminal to the outside of the wireless communication device. In this manner, the clock signal generated inside of the wireless communication device is output to the outside and the host is operated on the clock signal output to the outside, by virtue of which the host and the wireless communication device are allowed to be operated in synchronization with each other.

Tenth Embodiment

According to this embodiment, in addition to the features of the wireless communication device (a wireless communication device of a base station, a wireless communication device of a wireless terminal, or both of them) in accordance with the above-described embodiments, a power source, a power source controller, and a wireless power supply are provided. The power source controller is connected to the power source and the wireless power supply and configured to perform control to select the power source from which power is fed to the wireless communication device. In this manner, it is made possible to low power consumption operation in which the power source is allowed to be controlled by configuring the power source such that it is incorporated in the wireless communication device.

Eleventh Embodiment

According to this embodiment, in addition to the features of the wireless communication device in accordance with the above-described embodiments, a SIM card is provided. The SIM card is connected, for example, to the controller in the wireless communication device. Thus, by adopting a configuration in which the SIM card is included in the wireless communication device, authentication processing can be easily performed.

Twelfth Embodiment

According to this embodiment, a video image compressing/decompressing processor is added to the configuration of the wireless communication device according to any of the above embodiments. The video image compressing/decompressing processor is connected to the bus. Thus, by adopting a configuration in which the video image compressing/decompressing processor is included in the wireless communication device, transmitting a compressed video image and decompressing a received compressed video image can be easily done.

Thirteenth Embodiment

According to this embodiment, in addition to the features of the wireless communication device (a wireless communication device of a base station, a wireless communication device of a wireless terminal, or both of them) in accordance with the above-described embodiments, an LED (light-emitting diode) is provided. The LED is connected to at least one or more of the transmitter 202, the receiver 203, and the controller 201. In this manner, it is made possible to readily notify to the user the operating state of the wireless communication device by the configuration in which the LED is incorporated in the wireless communication device.

Fourteenth Embodiment

According to this embodiment, in addition to the features of the wireless communication device (a wireless communication device of a base station, a wireless communication device of a wireless terminal, or both of them) in accordance with the above-described embodiments, a vibrator is provided. The vibrator is connected, for example, to the controller in the wireless communication device. In this manner, it is made possible to notify to the user the operating state of wireless communication device by the configuration in which the vibrator is incorporated in the wireless communication device.

Fifteenth Embodiment

According to this embodiment, in addition to the features of the wireless communication device (a wireless communication device of a base station, a wireless communication device of a wireless terminal, or both of them) in accordance with the above-described embodiments, a display is provided.

The display may be connected to the controller of the wireless communication device via a not-shown bus.

It is made possible to notify to the user the operating state of wireless communication device by the configuration in which the display is provided so that the operating state of the wireless communication device is displayed on the display.

The frames described in the embodiments may denote an element called "packet" defined in the IEEE 802.11 or other standards they are compliant with such as Null Data Packet.

The terms used in each embodiment should be interpreted broadly. For example, the term "processor" may encompass a general purpose processor, a central firmware processor (CPU), a microprocessor, a digital signal processor (DSP), a controller, a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, or one or more microprocessors in conjunction with a DSP core.

As another example, the term "memory" may encompass any electronic component which can store electronic information. The "memory" may refer to various types of media such as a random access memory (RAM), a read-only memory (ROM), a programmable read-only memory (PROM), an erasable programmable read only memory (EPROM), an electrically erasable PROM (EEPROM), a non-volatile random access memory (NVRAM), a flash memory, and a magnetic or optical data storage, which are readable by a processor. It can be said that the memory electronically communicates with a processor if the processor read and/or write information for the memory. The memory may be arranged within a processor and also in this case, it can be said that the memory electronically communication with the processor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A signal detection device comprising:
a memory configured to store a program; and
processing circuitry for executing the program configured to:
  calculate a first signal level indicative of a signal level of a digital complex signal;
  calculate a first variation indicative of a temporal variation of the first signal level;
  calculate a statistic in a predetermined first time period on the basis of the first variation in the first time period; and
  perform determination regarding whether or not an interference source signal indicative of a signal by a radio wave from an interference source is included in the digital complex signal in the first time period on the basis of the statistic in the first time period;
  calculate a second signal level indicative of a signal level of the frequency signal by performing, in each of a plurality of predetermined third time periods, Fourier transform for the digital complex signal in the third time period into a frequency signal;
  compare the second signal level with a level threshold indicative of a threshold applied to the second signal level;
  calculate a first total number indicative of total number of the second signal levels satisfying a predetermined second condition for each frequency of the frequency signal regarding the second signal level on the basis of a comparison result associated with the level threshold and an interference source signal reception period indicative of a period determined by the determination that the interference source signal is included in the digital complex signal; and
  calculate a frequency band occupied by the interference source signal on the basis of the first total number or a computed value computed based on the first total number.

2. The signal detection device according to claim 1, wherein the statistic in the first time period is the number of first variations larger than a variation threshold in the first time period, the variation threshold being indicative of a threshold applied to the first variation.

3. The signal detection device according to claim 1, wherein the statistic in the first time period is calculated from an average, a variance, a probability density function, or a histogram of the first variation in the first time period.

4. The signal detection device according to claim 1, wherein the processing circuitry is further configured to:
  calculate two or more first signal levels in each of a plurality of predetermined second time periods from the digital complex signal in the second time periods;

calculate the first signal level associated with the second time period on the basis of the two or more first signal levels in the second time period; and calculate the first variation on the basis of the first signal level associated with the second time period.

5. The signal detection device according to claim 4, wherein a length of each second time period is defined to be shorter than a half cycle of switching performed in the interference source.

6. The signal detection device according to claim 1, wherein the first time period is equal to or longer than one cycle of switching performed in the interference source.

7. The signal detection device according to claim 1, wherein the first time period is shorter than one cycle of the interference source signal.

8. The signal detection device according to claim 1, wherein the first time period is defined on the basis of a magnitude of the first signal level.

9. The signal detection device according to claim 1, wherein the processing circuitry is further configured to perform filter processing for the first variation and calculate the statistic in the first time period on the basis of the first variation in the first time period subjected to the filter processing.

10. The signal detection device according to claim 9, wherein the statistic in the first time period is the number of first variations larger than a variation threshold in the first time period, the variation threshold being indicative of a threshold applied to the first variation, and the processing circuitry is further configured to shape the first time period on the basis of a time point satisfying a predetermined first condition among time points at which the first variation in the first time period exceeds the variation threshold, the first variation being subjected to the filter processing.

11. The signal detection device according to claim 1, wherein the second condition requires that the frequency signal regarding the second signal level is received within the interference source signal reception period and that the second signal level exceeds the level threshold.

12. The signal detection device according to claim 1, wherein the processing circuitry is further configured to:

calculate a second variation indicative of a variation of the second signal level in the third time period or a computed value computed based on the second variation as a parameter for calculating a weight coefficient by which the total number of the second signal levels is to be multiplied;

compare the parameter with a parameter threshold indicative of a threshold applied to the parameter;

calculate a second total number indicative of a total number of the parameters satisfying a predetermined third condition for each frequency of the frequency signal associated with the parameter on the basis of a comparison result regarding the parameter threshold and the interference source signal reception period;

calculate the weight coefficient for each frequency of the frequency signal on the basis of the second total number or a computed value computed based on the second total number; and calculate the frequency band occupied by the interference source signal on the basis of the weight coefficient and the first total number or a computed value computed based on the first total number.

13. The signal detection device according to claim 12, wherein the third condition requires that the frequency signal regarding the parameter is received within the interference source signal reception period and that the parameter exceeds the parameter threshold.

14. The signal detection device according to claim 1, wherein the processing circuitry is further configured to:

calculate a second variation indicative of a variation of the second signal level in the third time period or a computed value computed based on the second variation as a parameter for calculating a weight coefficient by which the total number of the second signal levels is to be multiplied;

compare the parameter with a parameter threshold indicative of a threshold applied to the parameter;

perform logical operation using a result of comparison of the second signal level regarding the frequency signal received in the interference source signal reception period and a result of comparison of the parameter, the logical operation being performed on the basis of a comparison result regarding the level threshold, a comparison result regarding the parameter threshold, and the interference source signal reception period;

calculate the weight coefficient for each frequency of the frequency signal on the basis of a result of the logical operation of the frequency signals having the same frequency; and calculate the frequency band occupied by the interference source signal on the basis of the weight coefficient and the first total number or a computed value computed based on the first total number.

15. A wireless communication device comprising:

receiving circuitry configured to receive a radio signal;

transmitting circuitry configured to transmit a radio signal; and processing circuitry configured to:

calculate a first signal level indicative of a signal level of a digital complex signal, calculate a first variation indicative of a temporal variation of the first signal level, calculate a statistic in a predetermined first time period on the basis of the first variation in the first time period, perform determination regarding whether or not an interference source signal indicative of a signal by a radio wave from an interference source is included in the digital complex signals in the first time period on the basis of the statistic in the first time period, calculate a second signal level indicative of a signal level of the frequency signal by performing, in each plurality of predetermined third time periods, Fourier transform for the digital complex signal in the third time period into a frequency signal, compare the second signal level with a level threshold indicative of a threshold applied to the second signal level, calculate a first total number indicative of a total number of the second signal levels satisfying a predetermined second condition for each frequency of the frequency signal regarding the second signal level on the basis of a comparison result associated with the level threshold and an interference source signal reception period indicative of a period determined by the determination that the interference source signal is included in the digital complex signal, and calculate a frequency band occupied by the interference source signal on the basis of the first total number or a computed value computed based on the first total number, wherein the receiving circuitry or the processing circuitry generating a digital complex signal based on the radio signal received via the receiving circuitry, and the processing circuitry controlling the transmitting circuitry on the basis of a result of the determination.

16. The wireless communication terminal according to claim 15 further comprising at least one antenna.

17. A wireless communication terminal comprising a control circuit configured to:

generate a digital complex signal from a received radio signal; calculate a first signal level indicative of a signal level of a digital complex signal;

calculate a first variation indicative of a temporal variation of the first signal level;

calculate a statistic in a predetermined first time period on the basis of the first variation in the first time period;

perform determination regarding whether or not an interference source signal indicative of a signal by a radio wave from an interference source is included in the digital complex signal in the first time period on the basis of the statistic in the first time period;

calculate a second signal level indicative of a signal level of the frequency signal by performing, in each of a plurality of predetermined third time periods, Fourier transform for the digital complex signal in the third time period into a frequency signal;

compare the second signal level with a level threshold indicative of a threshold applied to the second signal level;

calculate a first total number indicative of a total number of the second signal levels satisfying a predetermined second condition for each frequency of the frequency signal regarding the second signal level on the basis of a comparison result associated with the level threshold and an interference source signal reception period indicative of a period determined by the determination that the interference source signal is included in the digital complex signal; and calculate a frequency band occupied by the interference source signal on the basis of the first total number or a computed value computed based on the first total number; and control transmission of a radio signal on the basis of a result of the determination.

* * * * *